US009521601B2

(12) United States Patent
Varoglu et al.

(10) Patent No.: US 9,521,601 B2
(45) Date of Patent: Dec. 13, 2016

(54) MANAGEMENT OF MULTIPLE RADIO LINKS FOR WIRELESS PEER-TO-PEER COMMUNICATION

(71) Applicant: Apple Inc., Cupertino, CA (US)

(72) Inventors: Devrim Varoglu, Santa Clara, CA (US); Gencer Cili, Santa Clara, CA (US); Suresh Nagaraj, Sunnyvale, CA (US); Milan I. Patel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 14/169,597

(22) Filed: Jan. 31, 2014

(65) Prior Publication Data

US 2014/0219194 A1 Aug. 7, 2014

Related U.S. Application Data

(60) Provisional application No. 61/760,008, filed on Feb. 1, 2013.

(51) Int. Cl.
*H04W 36/14* (2009.01)
*H04W 76/04* (2009.01)

(52) U.S. Cl.
CPC .......... *H04W 36/14* (2013.01); *H04W 76/043* (2013.01)

(58) Field of Classification Search
CPC ............................ H04W 36/14; H04W 76/043
See application file for complete search history.

(56) References Cited

U.S. PATENT DOCUMENTS

| 2007/0116012 A1* | 5/2007 | Chang | H04W 48/18 370/395.52 |
| 2010/0128696 A1* | 5/2010 | Fantini | H04L 29/12028 370/331 |
| 2011/0070842 A1* | 3/2011 | Kwon | H04W 36/30 455/67.13 |
| 2011/0082940 A1* | 4/2011 | Montemurro | H04W 76/023 709/227 |
| 2011/0130092 A1* | 6/2011 | Yun | H04W 72/085 455/39 |
| 2013/0185654 A1* | 7/2013 | Harris | H04W 8/18 715/753 |
| 2013/0237226 A1* | 9/2013 | Periyalwar | H04W 76/026 455/436 |

\* cited by examiner

*Primary Examiner* — Melvin Marcelo
(74) *Attorney, Agent, or Firm* — Downey Brand LLP

(57) ABSTRACT

A method for management of multiple radio links for a wireless peer-to-peer (P2P) session is disclosed. The method can include a wireless communication device providing interface address information for a first radio interface and a second radio interface implemented on the wireless communication device to a peer device when establishing a wireless P2P session with the peer device; establishing a threshold for transitioning between the first radio interface and the second radio interface during the wireless P2P session; determining during the wireless P2P session that the threshold has been met; and in response to the threshold being met, signaling to the peer device to transition to the second radio interface, and using the second radio interface to continue the wireless P2P session.

20 Claims, 20 Drawing Sheets

MANAGEMENT OF MULTIPLE RADIO LINKS FOR WIRELESS PEER-TO-PEER COMMUNICATION

CROSS-REFERENCE TO RELATED APPLICATIONS

This application claims the benefit of U.S. Provisional Application No. 61/760,008, filed Feb. 1, 2013 and entitled "MANAGEMENT OF MULTIPLE RADIO LINKS FOR PEER-TO-PEER APPLICATIONS," which is incorporated by reference herein in its entirety for all purposes.

FIELD OF THE DESCRIBED EMBODIMENTS

The described embodiments generally relate to wireless communication technology, and more particularly to management of multiple radio links for wireless peer-to-peer (P2P) communication.

BACKGROUND

Modem wireless communication devices can engage in peer-to-peer (P2P) communication via wireless P2P connections. The wireless P2P connections can be supported via wireless local area network (WLAN) radios on the wireless communication devices, which can use a WLAN radio frequency band to carry P2P communications between the wireless communication devices. WLAN capable devices typically can support individual connections via multiple frequency bands. For example, many Wi-Fi devices support connections using radio frequency spectra in the 2.4 gigahertz (GHz) frequency band and in the 5 GHz radio frequency band.

Generally, current Wi-Fi radio equipped devices need to be pre-configured to use either a 2.4 GHz or a 5 GHz radio frequency band connection when establishing a wireless P2P connection. In this regard, there is no concurrent use of 2.4 GHz and 5 GHz radio frequency band connections. When establishing the P2P connection, users cannot always anticipate whether conditions that will be experienced during a connection session merit establishment of a 2.4 GHz connection or a 5 GHz connection. In this regard, a 5 GHz connection can provide better throughput than a 2.4 GHz connection, but the 5 GHz radio frequency band is less robust against path loss, and thus a 5 GHz connection has a shorter range than a 2.4 GHz connection. If one of the participating peer wireless communication devices is in a mobility state and moves out of working radio range for a 5 GHz connection, the peer devices cannot automatically switch to using a 2.4 GHz radio connection. Instead, device users have to re-configure the wireless P2P connection to use a 2.4 GHz Wi-Fi radio link. Wireless P2P data transfer is accordingly stalled until the user re-configures the wireless P2P Wi-Fi radio link to use a radio frequency band that has sufficient range to support a connection between the wireless communication devices. In a first embodiment, a method for management of multiple radio links for a wireless peer-to-peer (P2P) session, includes a wireless communication device providing interface address information for each of a plurality of radio interfaces implemented on the wireless communication device to a peer device. The plurality of radio interfaces may include a first radio interface and a second radio interface, and the method may include establishing the wireless P2P session with the peer device and establishing a threshold for transitioning between the first radio interface and the second radio interface during the wireless P2P session. In some embodiments, the method also includes determining, during the wireless P2P session, whether the threshold has been met. In response to the threshold being met, some embodiments include signaling to the peer device to transition the wireless P2P session from the first radio interface to the second radio interface and using the second radio interface to continue the wireless P2P session.

SUMMARY

In a second embodiment, a method for management of multiple radio links for a wireless peer-to-peer (P2P) session includes a peer device receiving a wireless P2P connection request from a wireless communication device. The peer device may also transmit an acceptance of the P2P connection to the wireless communication device, and start the wireless P2P session using a first radio link. Further, the peer device may receive an indication that the wireless communication device is exiting a wireless range for the first radio link and transition the wireless P2P session to use a second radio link.

In yet another embodiment, a wireless communication device, having a plurality of radio interfaces adapted to establish wireless peer-to-peer (P2P) sessions with a peer device, includes an interface management module and processing circuitry having a processor and a memory. The peer device also includes an application installed in the processing circuitry; a plurality of transceivers; and a plurality of antennas. Accordingly, each antenna is associated with a transceiver from the plurality of transceivers, wherein the plurality of antennas is configured to reduce electro-magnetic interference (EMI) for concurrent use of at least two antennas of the plurality of antennas. In some embodiments, the interface management module is configured to transfer data associated with the application using at least two antennas of the plurality of antennas.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Various embodiments disclosed herein provide for concurrent usage of multiple radio links, including concurrent use of multiple wireless local area network (WLAN) using different carrier frequencies. Multiple radio links as disclosed herein include wireless radio links between a first peer device and a second peer device. Embodiments in accordance with the present disclosure provide seamless switching between WLAN communication using one or more radio frequency bands and cellular radio for peer-to-peer (P2P) communication. Some such embodiments provide for concurrent use of multiple WLAN radio links for P2P application to yield increased throughput and improved user experience. Some embodiments provide for seamless fallback between use of different WLAN carrier frequencies, e.g., based on predetermined received power thresholds, to provide for data continuity during P2P communication. Embodiments as disclosed herein provide for a seamless P2P communication independent of a WLAN access point (AP) to which one of the first or second peer devices may be linked. In that regard, some embodiments of the methods and systems disclosed herein may perform seamless P2P communication bypassing a WLAN AP.

Figure 1:
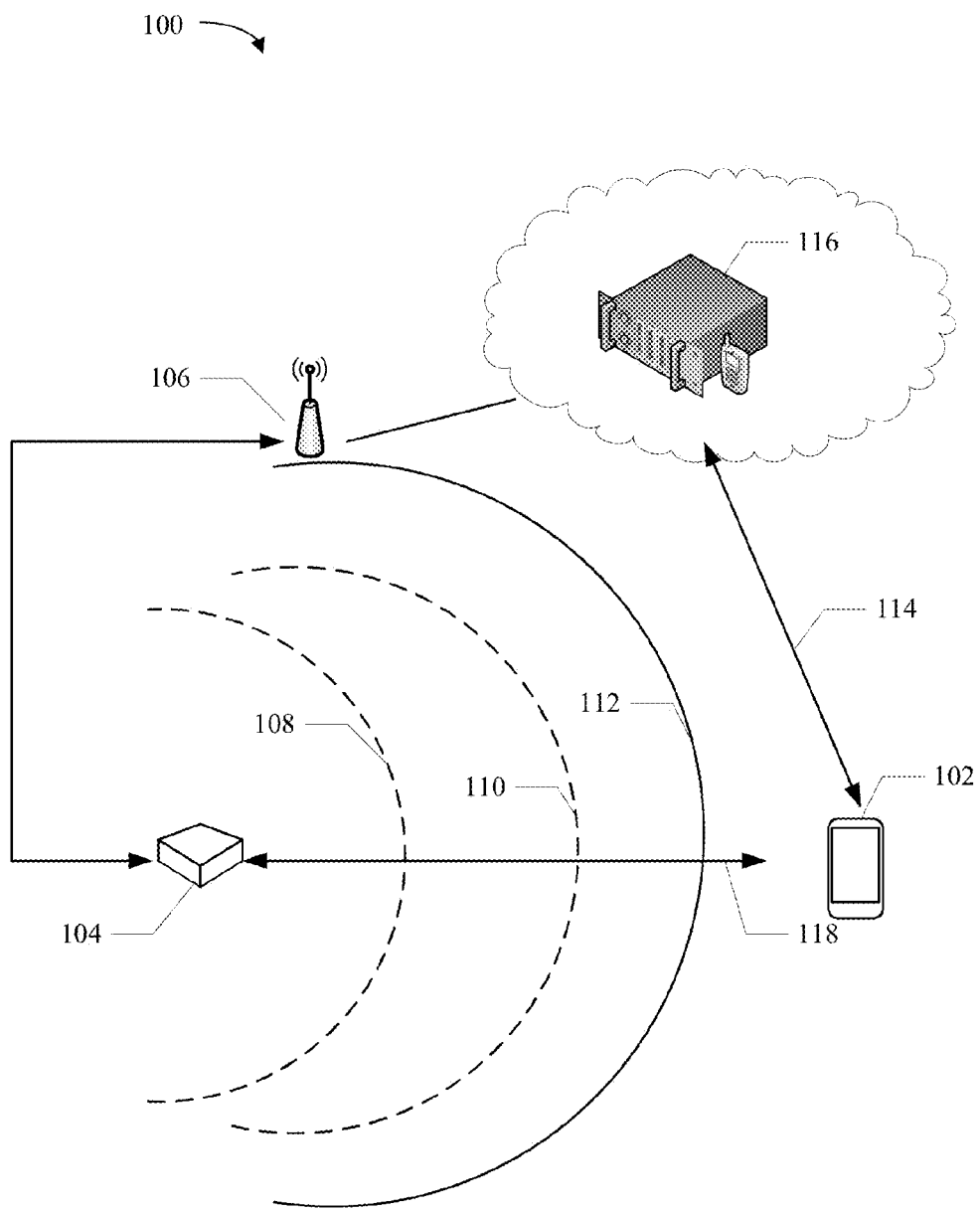
FIG. 1 illustrates a system including multiple radio links for peer-to-peer (P2P) communications, in accordance with some embodiments.

FIG. 1 illustrates a multiple radio link system 100 for P2P communication, in accordance with some embodiments. System 100 may include, for example, a WLAN and a cellular P2P fallback connection capability. In the example of FIG. 1, wireless communication device 102 and peer device 104 can establish a wireless P2P connection 118. The wireless P2P connection 118 can be established using one or more WLAN radio frequency bands in accordance with a wireless P2P technology, such as Wi-Fi direct, AWDL (Apple® Wireless Direct Link), or the like. In the example of FIG. 1, wireless communication device 102 can be a mobile communication device, such as a smart phone (e.g., an Apple® iPhone®) or a tablet computing device (e.g., an Apple® iPad®), which can be configured to wirelessly stream content over the wireless P2P connection 118. Peer device 104 can be a media receiver, such as an Apple® TV device, configured to receive content that is wirelessly streamed by wireless communication device 102. It will be appreciated, however, that the scenario of streaming content to a peer device is illustrated by way of example, and not by way of limitation. In this regard, embodiments can be applied to any wireless communication devices that can be configured to establish wireless P2P links with each other, including cellular phones, tablet computing devices, laptop computing devices, and/or other computing devices that having a wireless communication interface.

Peer device 104 can be connected to a network via an access point (AP) 106. For applications including a WLAN network, AP 106 may include a WLAN AP. As illustrated in FIG. 1, communication via a channel in a first frequency band, e.g. the 5.0 GHz band, for P2P connection 118 between wireless communication device 102 and peer device 104 can have a range 108. Communication via a second radio frequency band, e.g. the 2.4 GHz band, for P2P connection 118 between wireless communication device 102 and peer device 104 can have a range 110. Different radio frequencies may have different ranges for wireless communication. The range of a radio frequency used in wireless communication may depend on the robustness of the data throughput relative to a path loss, for each radio frequency. In some embodiments, robustness of the data throughput may depend on the modulation techniques available for each radio frequency, and the communication standard used. In some embodiments, a shorter range 108 may correspond to a communication via a higher radio frequency band, e.g. 5 GHz, while a longer range may correspond to communication via a lower radio frequency band, e.g. 2.4 GHz. It will be appreciated that WLAN and wireless P2P connections embodiments can be established in accordance with any WLAN technology, including, by way of non-limiting example, Wi-Fi or other technology that implemented with an Institute of Electrical and Electronics Engineers (IEEE) 802.11 standard. Thus, where embodiments are described in the context of Wi-Fi, it will be appreciated that such embodiments are provided by way of example, and not by way of limitation to use of Wi-Fi.

Indirect communication between wireless communication device 102 and peer device 104 via AP 106 can occur within a range 112 of the access point 106, such as when wireless communication device 102 has moved outside of range 110 relative to peer device 104. As illustrated in FIG. 1, range 108 may be shorter than range 110, and range 112 may be larger than range 108 and range 110. Some embodiments further provide for indirect P2P communication between wireless communication device 102 and peer device 104 via a cellular link 114 through a server 116. Server 116 may be a computer device coupled to a network and having access to wireless communication device 102 through the cellular link 114. Server 116 may also have access to peer device 104 through AP 106. More specifically, server 116 may be a P2P transition server. In this regard, wireless communication device 102 can use cellular link 114 when wireless communication device 102 travels outside of a range of peer device 104 and AP 106, e.g. beyond range 112. Thus, wireless communication device 102 may transmit and receive communications for the P2P connection with the peer device 102 via server 116 and AP 106. In this regard, as will be described further with respect to FIG. 2, some embodiments provide for seamless P2P fallback via interface transitions between a wireless P2P connection 118 and a cellular connection 114.

Figure 2:
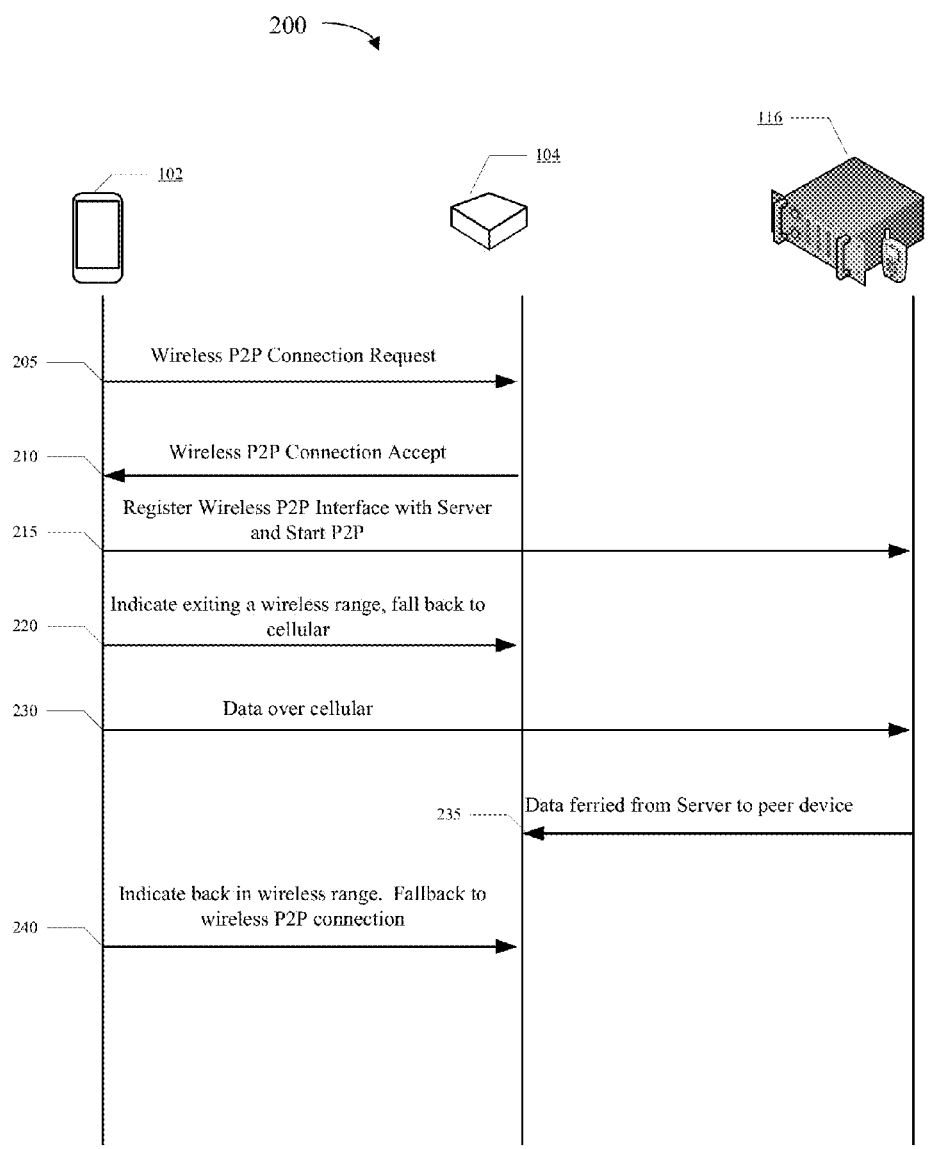
FIG. 2 illustrates a message flow for P2P fallback, in accordance with some embodiments.

FIG. 2 illustrates a message flow 200 for P2P fallback, in accordance with some embodiments. Operation 205 can include wireless communication device 102 sending a wireless P2P connection request, such as a request to establish a wireless connection with peer device 104. Some examples of wireless connections may include an Apple Wireless Direct Link (AWDL) connection, Wi-Fi direct connection, or the like. Operation 210 can include peer device 104 accepting the wireless P2P connection request. Operation 215 can include wireless communication device 102 registering the wireless P2P interface with server 116 to support cellular fallback when desired, and starting the P2P session with peer device 104.

In accordance with some embodiments, wireless communication device 102 and/or peer device 104 can have multiple wireless interfaces and network addresses, such as Internet Protocol (IP) addresses. For example, there can be an IP address for each radio frequency band that can be used to support a P2P Wi-Fi connection (e.g., an IP address for a 2.4 GHz, P2P, Wi-Fi connection and/or an IP address for a 5 GHZ, P2P, Wi-Fi connection). An IP address can also be specified for an infrastructure WLAN connection via AP 106. An IP address can additionally be specified for a cellular interface. An example interface-to-IP address mapping for wireless communication device 102 can be specified as illustrated in Table I.

TABLE I

| Interface | IP address |
|---|---|
| P2P interface 2.4 GHz | 192.168.1.22 |
| P2P interface 5 GHz | 192.168.1.23 |
| Wi-Fi Infrastructure | 17.202.12.128 |
| PDP (Cellular interface) | 10.0.1.12 |

Interface-to-IP address information can be exchanged between wireless communication device 102 and peer device 104 during initial connection configuration (e.g., during operations 205 and/or 210) so as to support seamless fallback, such as due to mobility during the P2P session. Wireless communication device 102 can additionally push its interface information to server 116 during operation 215 to register the P2P session with multiple interfaces. If the wireless communication device 102 does not have access to server 116 during initial connection, such as due to cellular coverage issues or lack of an infrastructure Wi-Fi connection, the wireless communication device 102 can continue to try to contact server 116 to register the P2P session when better coverage is found.

Wireless communication device 102 may indicate to peer device 104 that it is moving out of a wireless range (e.g., beyond range 112 of AP 106, cf. FIG. 1), and that the P2P session should fall back to the cellular interface of wireless communication device 102, as illustrated by operation 220. Wireless communication device 102 can transmit data destined for peer device 104 over cellular link 114, as illustrated by operation 230. Server 116 can relay the data to peer device 104, as illustrated by operation 235. In this regard, data can be routed (1) from wireless communication device 102 to server 116 via cellular link 114; (2) from server 116 to AP 106; and (3) from AP 106 to peer device 104. Peer device 104 can use the IP address for the cellular interface of wireless communication device 102 exchanged during connection setup in order to send data to wireless communication device 102 over a reverse path (cf. Table I).

Should wireless communication device 102 reenter a wireless coverage area, e.g. for AP 106 and/or for peer device 104, wireless communication device 102 can upgrade the connection to a wireless P2P connection. In this regard, as illustrated in operation 240, wireless communication device 102 can indicate to peer device 104 that it is back in Wi-Fi coverage in a WLAN (e.g., within one of range 108, 110, or 112), and that the session may revert to one of the respective Wi-Fi interfaces (e.g., 5 GHz, 2.4 GHz, or both). Since peer device 104 is aware of interface information for wireless communication device 102 from the connection setup phase (cf. Table I), fallback can be seamless.

Thus, some embodiments provide for a seamless interface transition between one or more wireless P2P connections, a connection via an infrastructure Wi-Fi network, and a connection via a cellular network as devices move within or out of a particular coverage range during a P2P session. Interface transition can be facilitated by interface-IP address information exchanged during connection setup (cf. Table I). Accordingly, a device can indicate to a peer device, e.g., peer device 104, that it is exiting a wireless coverage range, and to use another "fallback" interface, the address of which can be known to the peer device.

Figure 3A:
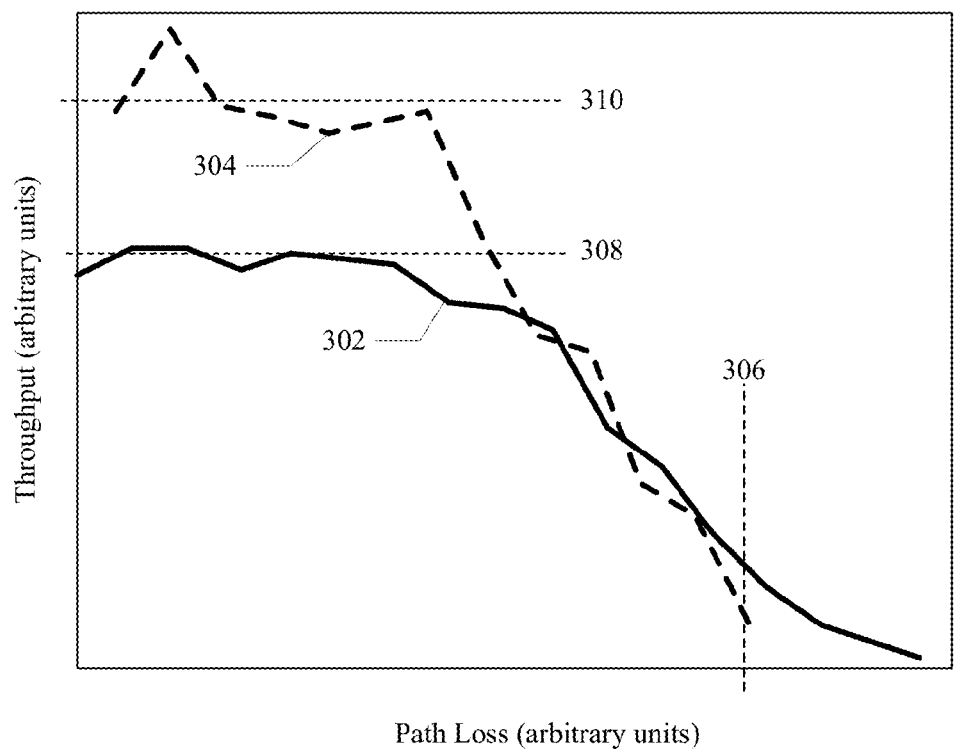
FIGS. 3A-3B illustrate throughput versus path loss for two distinct radio links, in accordance with some embodiments.
Figure 3B:
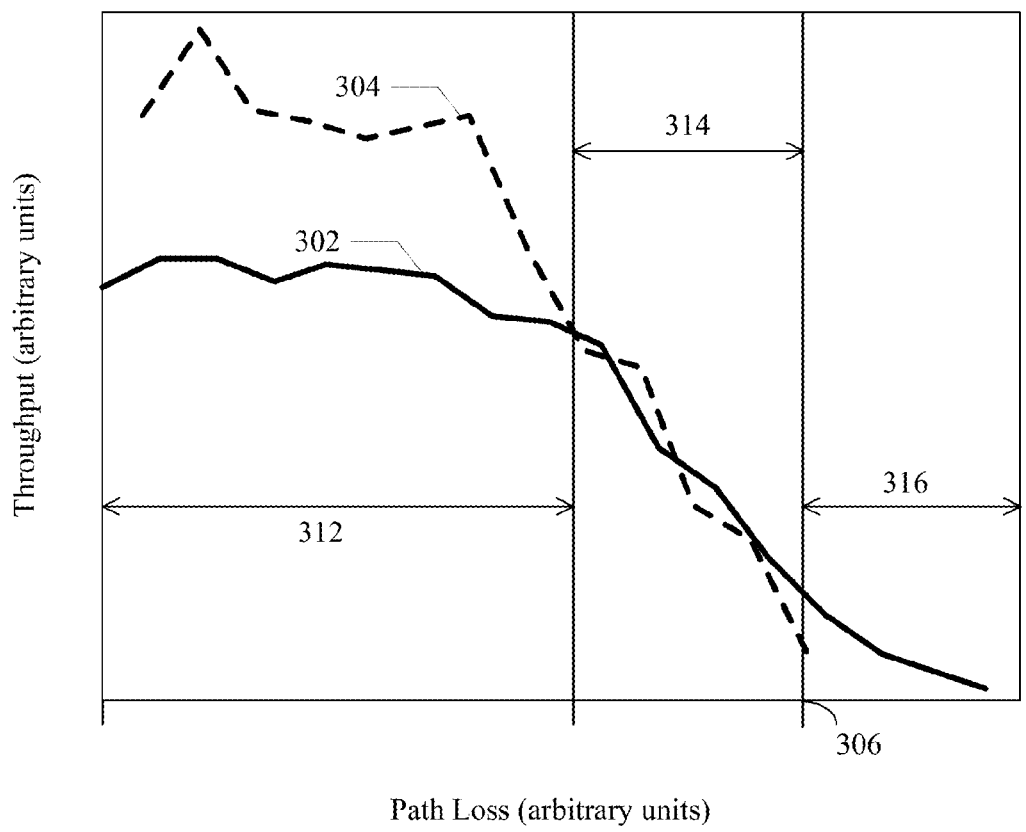

FIGS. 3A-3B illustrate throughput versus path loss in two radio links, according to some embodiments. The ordinate in FIGS. 3A-3B represents throughput in arbitrary units. Accordingly, in some embodiments the throughput may be measured in transmitted bits per unit time, such as mega-bits (Mbit=$10^6$ bits) per second (Mbits/s). The abscissa in FIGS. 3A-3B represents a path loss in arbitrary units. The abscissa in FIGS. 3A-3B indicates a range of the radio link, in the sense that the longer the range the greater the path loss, for a given radio link. Accordingly, the abscissa in FIGS. 3A-3B may be measured in a logarithmic scale, with units in decibels (dB) of signal loss: $(P_{Rx}/P_{Tx})$ [dB]=$-10 \cdot \log_{10}(P_{Rx}/P_{Tx})$ [Watts]. Where $P_{Rx}$ is the received signal power and $P_{TX}$ is the transmitted signal power. Radio links 302 and 304 in FIG. 3 may be used in a wireless P2P communication consistent with embodiments disclosed herein. First radio link 302 in FIG. 3A may operate within a first radio frequency band, and second radio link 304 may operate within a second radio frequency band. As can be seen, radio link 304 can provide a higher throughput 310 at shorter range relative to a throughput 308 for radio link 302, but may underperform relative to link 302 beyond a path loss threshold 306. Thus, radio link 302 can be desirable relative to radio link 304 for a wireless link range greater than path loss threshold 306. For example, in embodiments where the first radio frequency band is a 2.4 GHz frequency band and the second radio frequency band is a 5 GHz frequency band, throughput 308 may be about 50 Mbit/s, throughput 310 may be about 70 Mbit/s, and path loss threshold 306 may be 97 dB. In such configuration, a 2.4 GHz radio link may have a more robust performance relative to path loss compared to a 5 GHz radio link, e.g. due to the availability of different modulation schemes when operating at different radio frequencies in current wireless communication standards. For example, when radio link 302 uses a 2.4 GHz radio frequency band, radio link 302 may implement binary phase shift keying (BPSK) to improve throughput at low $P_{Rx}$. The precise value of path loss threshold 306 depends on the throughput characteristics of each radio link, and a power budget for wireless communication device 102 and peer device 104. For example, use of a lower radio frequency band link may be preferred when the battery consumption of wireless communication device 102 is weighted favorably. One of ordinary skill will recognize that radio links operating at different radio frequencies may have different throughput curves, without limiting the embodiments illustrated in FIGS. 3A and 3B.

FIG. 3B illustrates the throughput versus path loss curves as shown in FIG. 3A, further including a short range region 312, a transition region 314, and a long range region 316. Regions 312, 314, and 316 define a partition of the wireless link range according to path loss values, in view of the throughput obtained for each of the multiple radio links available. For example, short range region 312 may include link ranges where radio link 304 outperforms radio link 302. A multiple radio link for wireless P2P communication may determine that radio link 304 be used in the short range region 312, according to some embodiments. In some embodiments, a multiple radio link for wireless P2P communication may determine that both radio links 302 and 304 be used concurrently in the region 312 to increase data throughput. Transition region 314 may include radio link ranges in which radio link 302 and radio link 304 show similar performance. Accordingly, when moving from short range region 312 into transition region 314, wireless communication device 102 may request peer device 104 to switch from radio link 304 to radio link 302. Long range region 316 may include link ranges where radio link 302 outperforms radio link 304. Accordingly, path loss threshold 306 may define long range region 316. When moving from long range region 316 into transition region 314, wireless communication device 102 may request a switch from radio link 302 to radio link 304. FIGS. 3A-3B illustrate radio links 302 and 304 by way of example. One of ordinary skill will recognize that any number of radio links may be included in a multiple radio link wireless P2P communication system, in accordance with the present disclosure.

Figure 4:
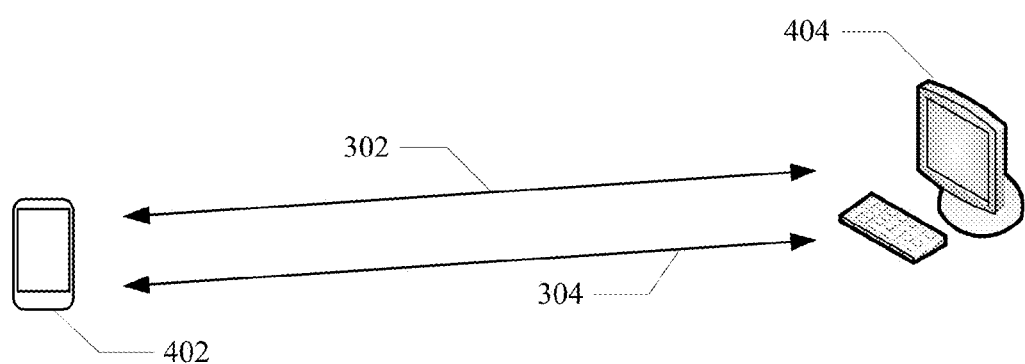
FIG. 4 illustrates use of multiple radio links, in accordance with some embodiments.

FIG. 4 illustrates concurrent use of multiple radio frequency links, in accordance with some embodiments. In this regard, within short range region 312 (cf. FIG. 3B), it can be advantageous to concurrently use both radio links 302 and 304 and for wireless P2P communication in accordance with some embodiments. Such concurrent radio frequency link usage can be used to increase Tx/Rx throughput, better facilitate fallback for mobility purposes, and/or other purposes, as will be described further herein. It will be appreciated that, while embodiments are described with respect to concurrent use of connections via radio frequency links in the 2.4 GHz and the 5 GHz radio frequency bands, embodiments can facilitate concurrent use of and transition between any carrier frequencies that can be used by radio links 302 and 304 to facilitate wireless P2P connections. In embodiments using concurrent multiple carrier frequencies, harmonic combinations between the signals in radio links 302 and 304 links may be suppressed using suitable filtering techniques. Harmonic interferences between radio links operating at a first radio frequency f1 and at a second radio frequency f2 may include two-tone intermodulation (IM2), three-tone intermodulation (IM3), including 2f1-f2, and 2f2-f1 tones, and four-tone intermodulation (IM4). These intermodulation tones and other higher tone intermodulation combinations can be filtered out by a receiver during concurrent radio usage.

Figure 5:
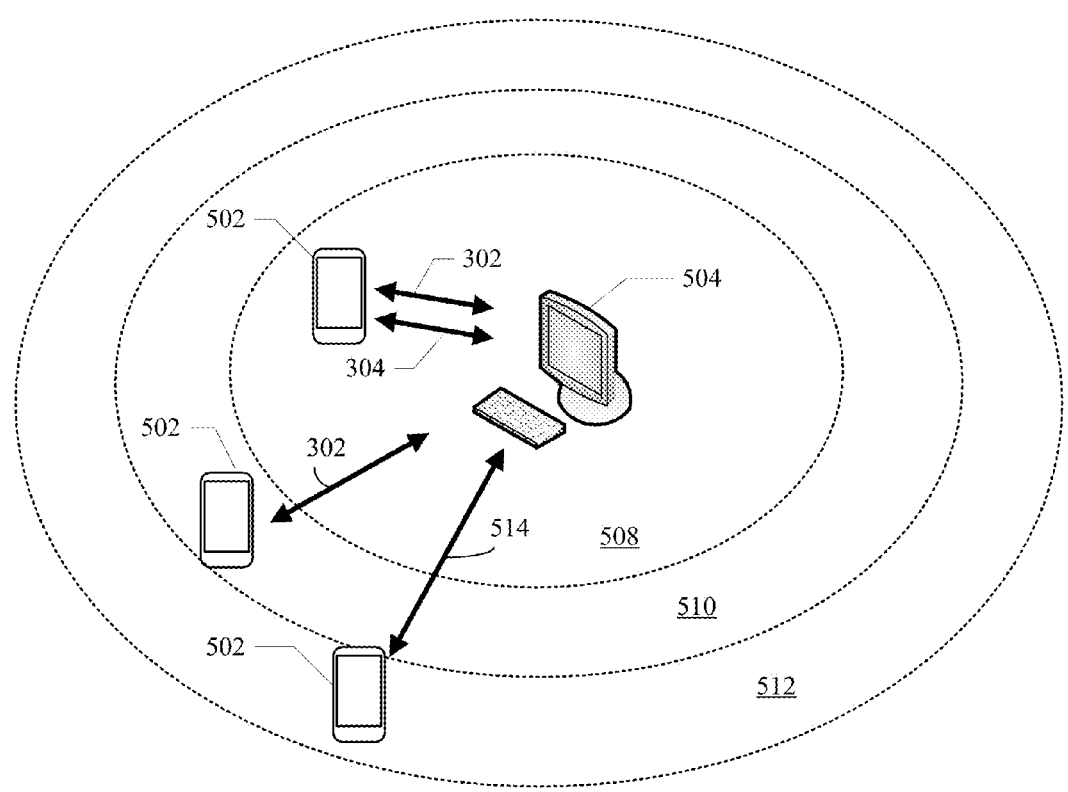
FIG. 5 illustrates concurrent use of and transition between multiple radio links, in accordance with some embodiments.

FIG. 5 illustrates concurrent use of, and transition between multiple radio link connections, in accordance with some embodiments. When within a short range 508 (e.g., short range 312, cf. FIG. 3), multiple radio links, e.g. radio links 302 and 304, can be setup to facilitate concurrent usage of radio links 302 and 304. According to embodiments disclosed herein, radio link 302 may be more robust against path loss relative to link radio 304 (e.g., when radio link 302 operates in a 2.4 GHz radio frequency band, and radio link 304 operates in a 5 GHz radio frequency band). Thus, in some embodiments it may be desirable to transition from an interface for radio link 304 to an interface for radio link 302 when wireless communication device 502 enters a transition region 510 and a path loss exceeds a threshold value (e.g., path loss threshold 306, cf. FIG. 3A). Within the short range 508, participating peer devices 502 and 504 can elect to use multiple concurrent radio frequency connections (cf. FIG. 4), or to use a single radio frequency band connection. For example, a wireless communication device 502 entering short range 508 from transition region 510 can suspend radio link 302 and resume use of radio link 304. In some embodiments, wireless communication device 502 may keep radio link 302 running in the background. When a device, e.g. device 502, travels outside of short range region 508, such that received power becomes less than a first threshold for radio link 304, peer device 504 can suspend radio link 304 and resume radio link 302 through signaling. When a device exits the transition region 510, such that received power becomes less than a threshold for radio link 302, the P2P session can activate a cellular P2P fallback link 514. Thus, as wireless communication device 502 moves within various coverage ranges, signaling with peer device 504 can indicate that wireless communication device 502 is entering/exiting a coverage range (e.g., regions 508, 510, and 512) and that a connection should be suspended or resumed. In some embodiments, the session between wireless communication device 502 and peer device 504 reverts to a fallback interface technology such as a cellular interface, when wireless communication device 502 roams outside of a region supported by links 302 and 304. Interface transitions can be triggered by a metric for a signal received from the peer device, such as received power ($P_{Rx}$). Thus, if $P_{Rx}$ is lower than a threshold, then a transition between use of different interfaces on the wireless communication device 502 that supports different radio frequency band connections can occur.

Figure 6:
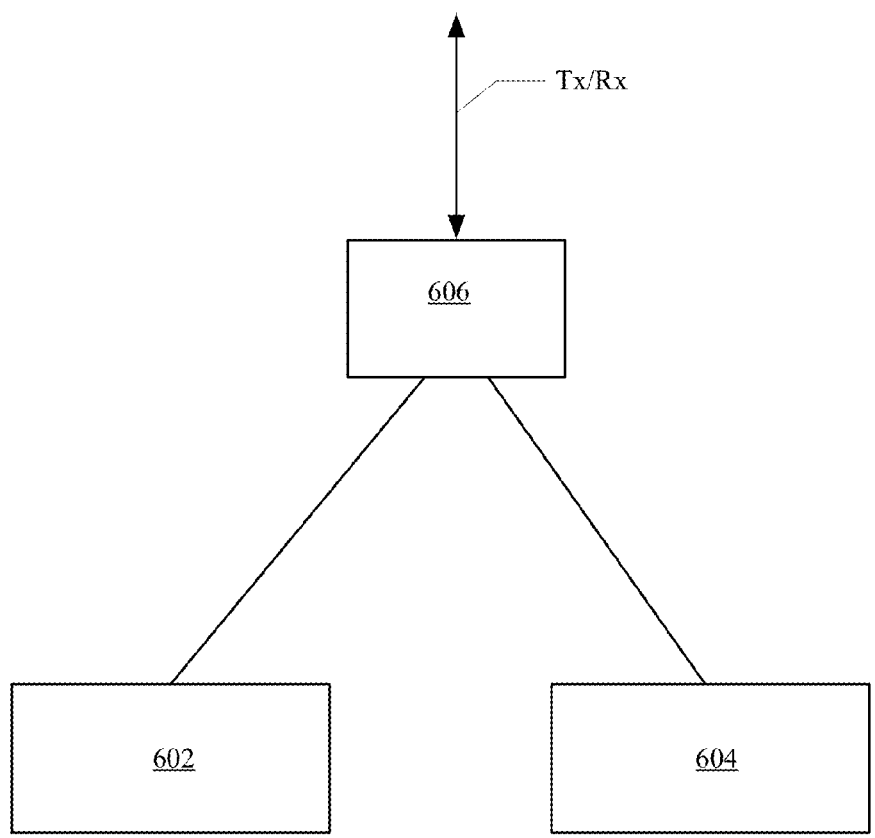
FIG. 6 illustrates usage of a virtual Internet Protocol (IP) address with multiple P2P radio links, in accordance with some embodiments.

FIG. 6 illustrates usage of a virtual Internet Protocol address with multiple wireless P2P radio links, in accordance with some embodiments. In this regard, a virtual IP address can be assigned for each respective interface of a wireless communication device. Thus, virtual IP address 602 can be used for a "2.4 GHz" Wi-Fi interface and virtual IP address 604 can be used for a "5 GHz" Wi-Fi interface. A wireless communication device (e.g., wireless communication device 102 or 502, cf. FIGS. 1 and 5) having an IP address 606, can adaptively switch between virtual IP addresses 602 and 604 during P2P data transfer to support interface transitions and/or concurrent interface usage.

Figure 7:
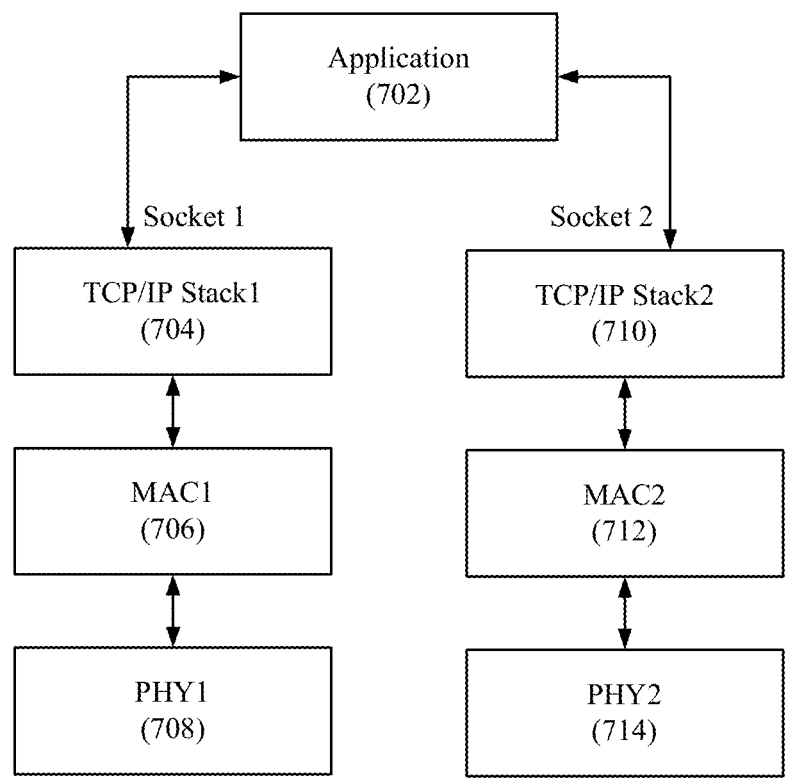
FIG. 7 illustrates a scheme to manage a multiple interface in a wireless communication device executing an application, in accordance with some embodiments.

FIG. 7 illustrates a representative implementation to manage multiple interfaces in a wireless communication device executing an application, in accordance with some embodiments. In this regard, when using multiple interfaces that can be active at any given moment, data can be routed between an application layer and respective active interfaces. In the example implementation of FIG. 7, an application 702 can be interface aware and can be provided with information with respect to available interfaces. Multiple Transmission Control Protocol (TCP)/IP stacks can be available for the application (e.g., TCP/IP stack 1 704 and TCP/IP Stack 2

710). Each TCP/IP stack can be associated with a respective IP address and a respective interface. Thus, a first interface can be associated with TCP/IP Stack 1 704, Media Access Control (MAC) layer MAC1 706, and physical (PHY) layer PHY1 708, while a second interface can be associated with TCP/IP Stack2 710, MAC2 layer 712 and PHY layer PHY2 714. Application 702 can load share data based on factors such as a cost for use of a particular interface, throughput, load balancing, and others. Accordingly, Application 702 dynamically allocates data between interfaces. In some embodiments, a preferred/primary interface can be provided to which data can be transmitted and/or received by default. Thus, Application 702 can have a built-in capability to determine different IP addresses associated with the interfaces, and to decide which data portion goes to either interface. Thus, Application 702 may be modified to conform with embodiments consistent with FIG. 7. Embodiments consistent with FIG. 7 can provide application developers the opportunity to adapt application 702 to exploit the multiple radio link resources of a wireless communication device. Accordingly, application 702 may have uniquely adapted data flow instructions for the first, the second, or both interfaces.

Figure 8:
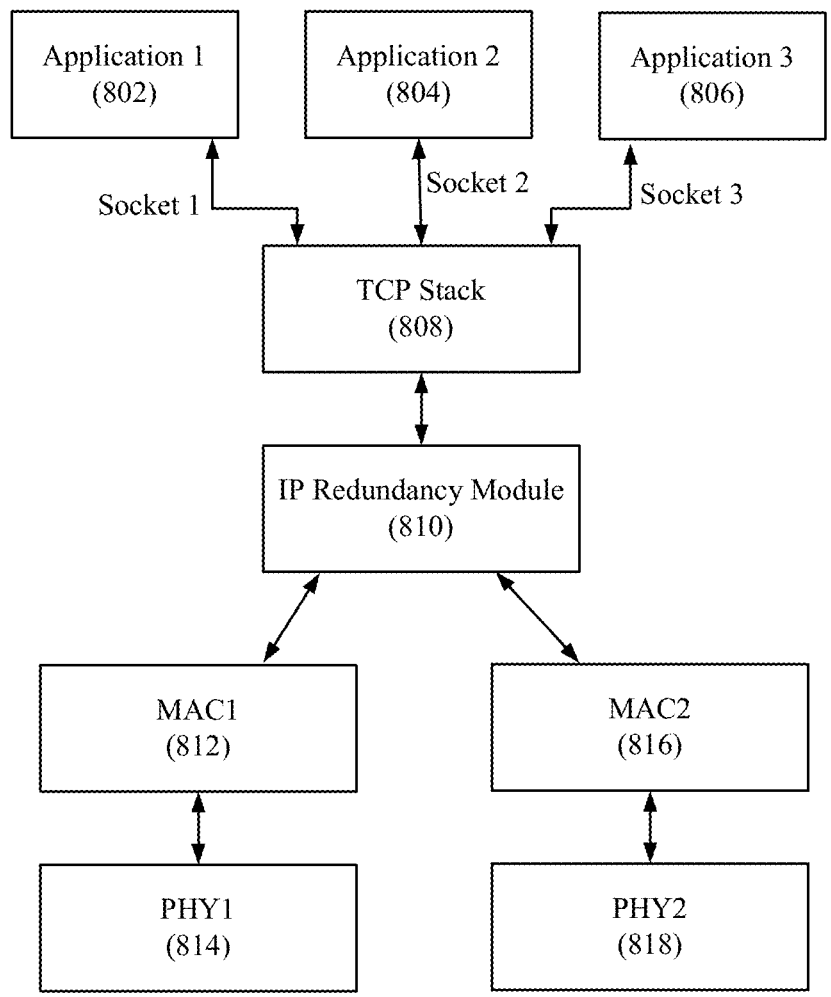
FIG. 8 illustrates a scheme to manage multiple radio link interfaces in a wireless communication device executing a plurality of applications, in accordance with some embodiments.

FIG. 8 illustrates another implementation to facilitate management of a multiple interfaces in a wireless communication device executing multiple applications, e.g., application 1 (802), application 2 (804), and application 3 (806). In the implementation of FIG. 8, an application can be agnostic to the existence of multiple active interfaces, and can be uninvolved in allocating data between interfaces. As such, no modification may be required for an application to function within the example of FIG. 8. In the example of FIG. 8, Application 1 (802), Application 2 (804), and Application 3 (806), can communicate data for transmission to a single TCP stack 808. TCP stack 808 can be interfaced with an IP redundancy module 810, which can handle load sharing and packet redundancy at the IP level. IP redundancy module 810 can be provided with interface information and, if applicable, a preferred interface list, which can be cost based and dynamic. Data redundancy can be achieved over multiple MAC interfaces (e.g., MAC1 812 and MAC2 816) with the IP redundancy module 810. Accordingly, the different interfaces and their respective IP addresses in FIG. 8 can be transparent to each of applications 802, 804, and 806. IP redundancy module 810 can distribute the data flow between each interface and each application 802, 804, 806. Embodiments consistent with FIG. 8 can use a single TCP/IP stack, e.g., TCP stack 808 and IP redundancy module 810. In some embodiments IP redundancy module 810 may be a software module.

During configuration of a wireless P2P connection, participating devices can indicate their respective capabilities to each other via an information element in a capability/setup message. For example, a device can indicate the radio frequency bands in radio frequency channels, and/or specific radio frequencies in which it is capable of operating. Example capability information elements in accordance with some embodiments are listed in Table II.

TABLE II

| | |
|---|---|
| Dual Radio Capable | Device is capable of concurrent Wi-Fi Radio operation |
| Single Radio Capable_2.4 | Device is only capable of 2.4 GHz Wi-Fi Operation |
| Single Radio Capable_5 GHz | Device is only capable of 5 GHz Wi-Fi Operation |

Participating devices in a wireless P2P connection as disclosed herein may be wireless communication device 102 and peer device 104, as described in detail herein (cf. FIG. 1). In some embodiments, participating devices in a P2P connection may include a master device, which can have a more active role, and a slave device, which can receive instructions and requests from the master device. During a Wi-Fi P2P synchronization procedure, devices can further exchange P2P fallback capability information and applicable thresholds for fallback triggers. Both the master device and the slave device in a wireless P2P communication session can trigger fallback operation. Transitions included when using multiple radio links during a P2P session as disclosed herein are listed in Table III.

TABLE III

| | |
|---|---|
| Single Radio Transitions | 5 GHz => 2.4 GHz Fallback |
| | 2.4 GHz => 5 GHz Transition |
| Concurrent Radio Transitions | 2.4 + 5 GHz => 2.4 GHz Fallback |
| | 2.4 + 5 GHz => 5 GHz Fallback |
| | 2.4 => 2.4 + 5 GHz Upgrade |
| | 5 => 2.4 + 5 GHz Upgrade |

Figure 9:
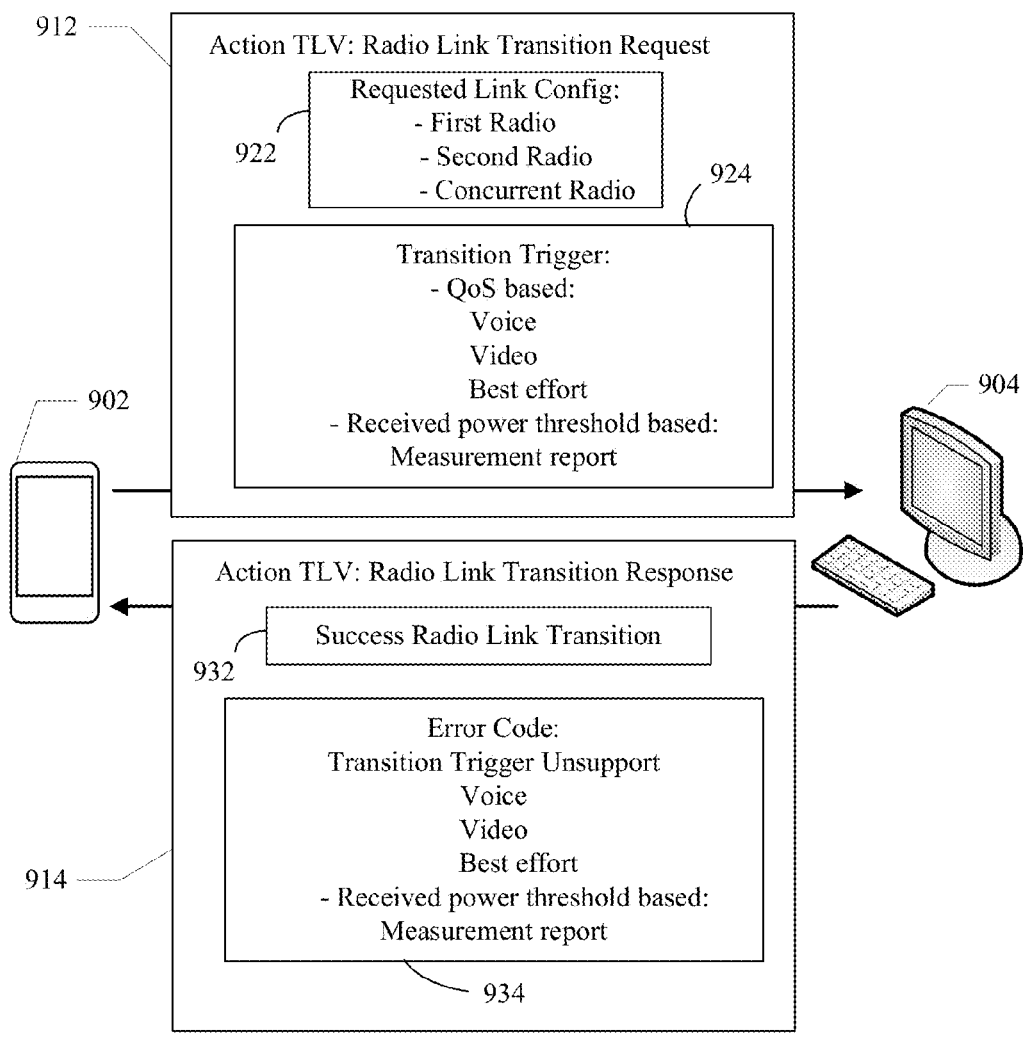
FIG. 9 illustrates a messaging procedure between peer devices to facilitate a radio link transition in a multiple radio link communication, in accordance with some embodiments.

FIG. 9 illustrates a messaging procedure between peer devices to facilitate a radio link transition in accordance with some embodiments. Peer devices in FIG. 9 may include a master device 902 and a slave device 904. Accordingly, master device 902 may be a wireless communication device, and slave device 904 may be a peer device, as described herein (e.g., wireless communication device 102 and peer device 104, cf. FIG. 1). In embodiments consistent with the present disclosure, a slave/master status may be based on the mobility of each peer device. Accordingly, a peer device that is more mobile may be established as the master device, and the peer device that is less mobile may be established as the slave device. Master device 902 and slave device 904 can negotiate multiple radio link management to be based on a quality of service based (QoS Based), on Received Power Threshold (Received Power Threshold Based), or on a combination thereof. With reference to FIG. 9, master device 902 can send a Radio Link Transition Request message 912 including one or more of the information elements 922 and 924 during connection setup and/or when master device 902 wishes to change a previously negotiated radio link configuration. Message 912 can include a "Requested Link Configuration" information element 922, which can request use of only a single radio frequency band (e.g., in the 2.4 GHz or 5 GHz frequency bands), or can request concurrent use of multiple carrier frequencies (Concurrent Radio). Message 912 can additionally include a Transition Trigger information element 924, which can define criteria for triggering an interface transition between radio interfaces. In instances in which a QoS Based trigger is used, a QoS trigger and/or a preferred interface can be defined for respective service classes, such as voice, video, best effort, background traffic, and/or the like.

In instances in which a received power threshold (or other signal quality based) threshold is used, a threshold measurement report value can be specified. In instances in which a combination of QoS Based and Received Power Threshold Based triggers are used, a received power threshold can be specified for each respective QoS class. In some embodiments, a hysteresis parameter ($P_{RX\_hysterisis}$) value can be tuned for respective service classes. For example, a large hysteresis parameter value can be used for best effort traffic, but a smaller hysteresis value can be used for video traffic.

If a small hysteresis parameter value is used, then it can be easier to "upgrade" to use concurrent radio links (e.g., concurrent use of radio links in the 2.4 GHz and 5 GHz radio frequency bands). Thus, for example, a hysteresis parameter can be reduced for a high definition streaming application so that devices can more easily meet a concurrent radio transition criterion, $P_{RX} > P_{RX\_Concurrent} + P_{RX\_hysterisis}$. A larger hysteresis parameter value can be used if concurrent link utilization is not desired.

Tables IV and V illustrate example threshold values that can be configured (e.g., via a Radio Link Transition Request message) with a QoS based and/or a received power threshold based system embodiment. Data in Tables IV and V can be exchanged between peer devices during link setup. In some embodiments, a device can store a transition threshold table for a peer device (e.g., Table V).

TABLE IV

| Received Power Quantized Thresholds | Meaning |
| --- | --- |
| $P_{RX\_Concurrent}$ | Minimum power required for concurrent Wi-Fi radio operation |
| $P_{RX\_5}$ | Minimum power required for single radio 5 GHz operation |
| $P_{RX\_2.4}$ | Minimum power required for single radio 2.4 GHz operation |
| $P_{RX\_Cellular}$ | Minimum power required for cellular P2P fallback |
| $P_{RX\_hysterisis}$ | Received power hysteresis to avoid temporary link failures during transition |

TABLE V

| Received Power | P2P Radio Link Transition Request |
| --- | --- |
| $P_{RX} < P_{RX\_Concurrent} + P_{RX\_hysterisis}$ | Requested Link Config: 5 GHz |
| $P_{RX} < P_{RX\_5} + P_{RX\_hysterisis}$ | Requested Link Config: 2.4 GHz |
| $P_{RX} < P_{RX\_2.4} + P_{RX\_hysterisis}$ | Requested Link Config: Cellular Fallback |
| $P_{RX} > P_{RX\_Concurrent} + P_{RX\_hysterisis}$ | Requested Link Config: Concurrent Radio Link |
| $P_{RX} > P_{RX\_5} + P_{RX\_hysterisis}$ | Requested Link Config: 5 GHz |
| $P_{RX} > P_{RX\_2.4} + P_{RX\_hysterisis}$ | Requested Link Config: 2.4 GHz |

The first three items in Table V may reflect a transition due to master device 902 moving away from slave device 904. Thus, master device 902 may request a "downgrade" of the P2P connection from a link using a 5 GHz radio frequency band to a link using a 2.4 GHz radio frequency band (e.g., when transitioning from region 508 to region 510, cf. FIG. 5). Further, master device 902 may request a "downgrade" of the P2P connection from the 2.4 GHz link to a cellular fallback link (e.g., when transitioning from region 510 to region 512, cf. FIG. 5). On the other hand, when master device 902 approaches slave device 904, the opposite situation can occur. This is reflected in the last three items in Table V. Accordingly, when $P_{Rx}$ allows for a link "upgrade," master device 902 may request it. The hysteresis value may be set at a low value such that it is easier to upgrade to a concurrent link, for example in the case of video applications.

A hysteresis value may be set high for a best effort application, for which use of a concurrent link may not be desirable. Accordingly, values for the hysteresis parameter can be a function of the QoS class. Before updating the received power value, the hysteresis value can be set according to a desired QoS class. Table VI below shows a mapping for different QoS classes, how QoS classes may relate to specific applications running in peer devices, and a preferred radio link configuration for each, according to embodiments consistent with the present disclosure. A mapping including data as in Table VI may be stored in each of the peer devices participating in the P2P connection (e.g., master device 902 and slave device 904).

TABLE VI

| QoS Service Class | Example | Preferred Radio Link Config |
| --- | --- | --- |
| Voice | VoIP, Skype | 2.4 GHz |
| Video | Video conference, streaming | Concurrent |
| Background | Email, FTP | 5 GHz |
| Best Effort | Online Gaming | 5 GHz |

Slave device 904 can respond to a Radio Link Transition Request message 912 with a Radio Link Transition Response message 914, which can include one or more of the information elements, (cf. block 914). In this regard, a success indication, e.g. "Success Radio Link Transition" 932, can be provided if slave device 904 has accepted the request parameters. If, however, there is an error, an error code 934 can be included in the response, indicating a cause of the error. By way of non-limiting example, error causes indicated in error code 934 can include a transition trigger that is unsupported by slave device 904, a temporary failure indication, a received power threshold that is unfavorable to slave device 904, a QoS transition that is unfavorable to slave device 904, or an unspecified error.

In the event of an error code 934 due to a temporary failure, a back-off radio link transition request retry algorithm can be triggered. If error code 934 indicates an unfavorable received power threshold (Unfavorable Rx Power) or unfavorable QoS transition (Unfavorable QoS transition), master responsibility can be transferred to the device that requested the transition to be the initiator of the following Radio Link Transition request when the received power threshold is within the accepted range. As such, P2P radio link transition initiation power can be given to the more mobile device in order to avoid unnecessary signaling.

In some embodiments, a device can avoid unnecessary signal processing complexity. For example, for applications that do not require high bandwidth, concurrent radio use may not be optimal. A predefined QoS service class versus preferred radio link configuration table can be used to manage P2P links (cf. Table VI). Depending on the coverage region of peer devices and the running P2P data application between the peer devices, a device that initiates the data connection can be responsible for QoS based link transition management. A QoS service class change in a wireless P2P connection can trigger a Radio Link Transition change when there is a preferred link configuration mismatch.

FIGS. 10A-10E illustrate multiple radio link operation modes in accordance with some embodiments. As described, capabilities can be exchanged during setup of a wireless P2P connection. When master device 902 and slave device 904 have multiple radio link capabilities, some embodiments provide two different methods to use the multiple radio links: (1) simultaneous transfer mode, in which data can be transferred on both (or each available) radio links simultaneously; and (2) simultaneous connection with a "keep alive" mode, in which data can be transferred on one radio link connection, while a second radio link connection can be kept alive. FIGS. 10A-10E illustrate multiple radio link operation modes, in accordance with such embodiments. It will be appreciated that these modes are also applicable to infrastructure networks when a Wi-Fi access point is capable of supporting multiple radio link operation.

Figure 10A:
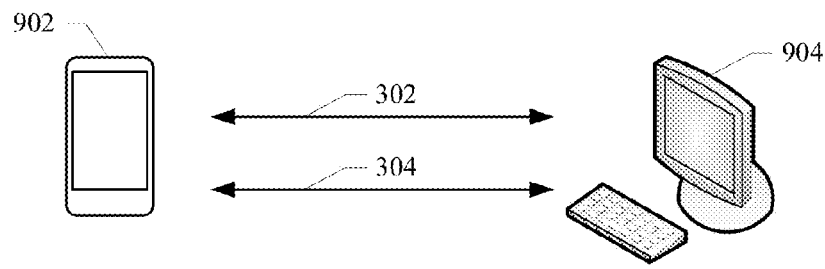
FIGS. 10A-10E illustrate multiple radio link operational modes, in accordance with some embodiments.

FIG. 10A illustrates that peer devices can establish simultaneous connections on multiple radio links 302 and 304, e.g., as described herein (cf. FIGS. 3A-3B, 4 and 5). Accordingly, radio link 302 may operate in a 2.4 GHz radio frequency band and radio link 304 may operate in a 5 GHz radio frequency band. In some embodiments, the first and second radio links illustrated in FIG. 10A may be used for the same application running in master device 902 and in slave device 904.

Figure 10B:
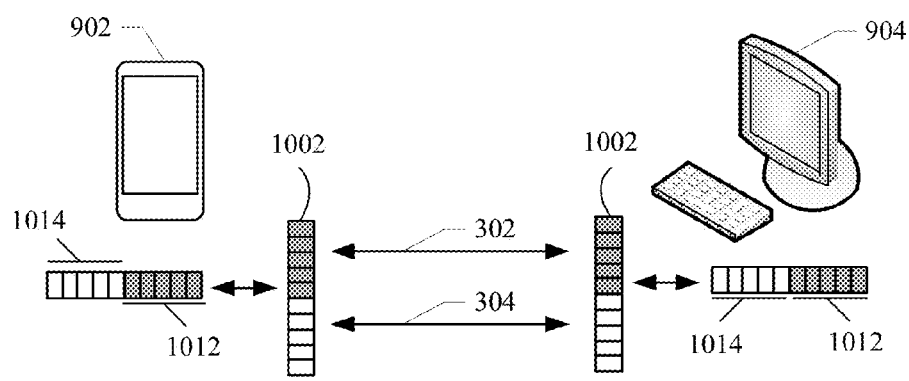
Figure 10C:
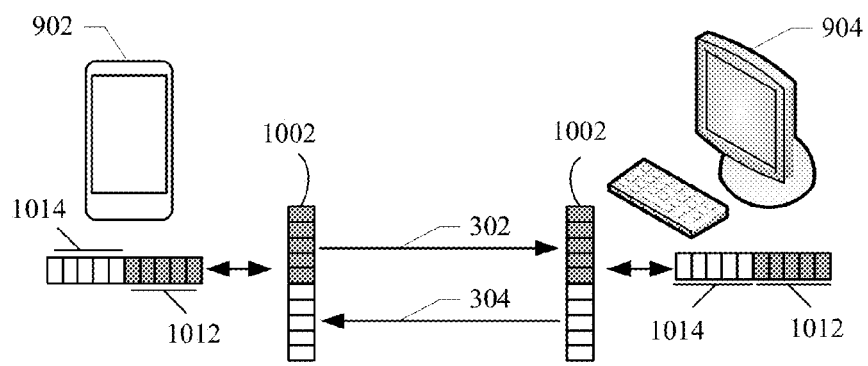
Figure 10D:
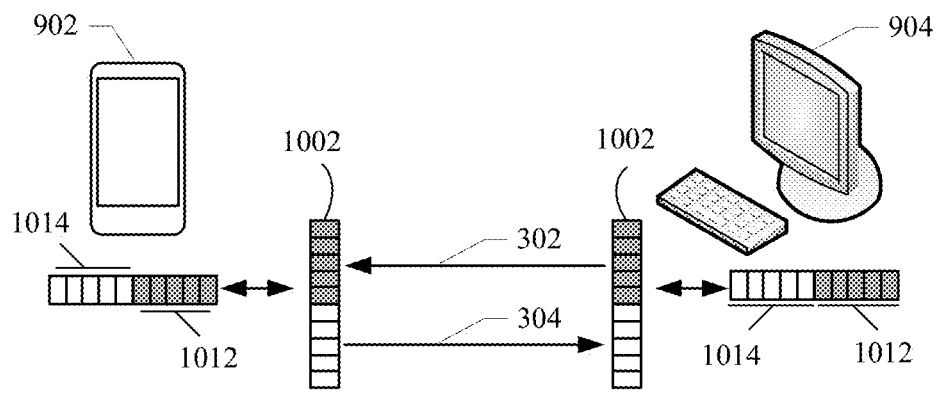

FIGS. 10B-10D illustrate respective options for use of a simultaneous transfer mode. In FIG. 10B, both radio links 302/304 can be used to transmit and receive data 1002. Data 1002 may include a data portion 1012 transmitted and received over radio link 302, and a data portion 1014 transmitted and received over radio link 304. The data transmitted or received over each radio link 302 and 304 can be determined by the bandwidth on each. A signal to noise ratio (SNR) and/or a received signal strength indicator (RSSI) for a radio link can additionally be taken into consideration when determining an amount of data to send or receive over a radio link.

In the examples of FIGS. 10C and 10D, radio links can be split to perform "transmit" (Tx) or "receive" (Rx) functions only, such as depending on respective Rx and Tx QoS requirements and the characteristics of each of master device 902 and slave device 904. Accordingly, data portion 1012 may be transmitted by master device 902 and received by slave device 904. And data portion 1014 may be received by master device 902 and transmitted by slave device 904. As an exemplary embodiment, consider radio link 302 operating in a 2.4 GHz radio frequency band and radio link 304 operating in a 5 GHz radio frequency band. In such configuration, when an Rx requirement (e.g., bandwidth requirement) exceeds a Tx requirement in master device 902, then a 5 GHz radio frequency band can be allocated for Rx only (i.e., data portion 1014) and Tx can be handled by the 2.4 GHz radio frequency band (i.e., data portion 1012), as illustrated in FIG. 10C. On the other hand, in the same configuration, when master device 902 has a Tx requirement that exceeds an Rx requirement, then the 5 GHz radio frequency band can be allocated for Tx only (i.e., data portion 1014) and Rx can be handled by the 2.4 GHz radio frequency band (i.e., data portion 1012), as illustrated in FIG. 10D.

Figure 10E:
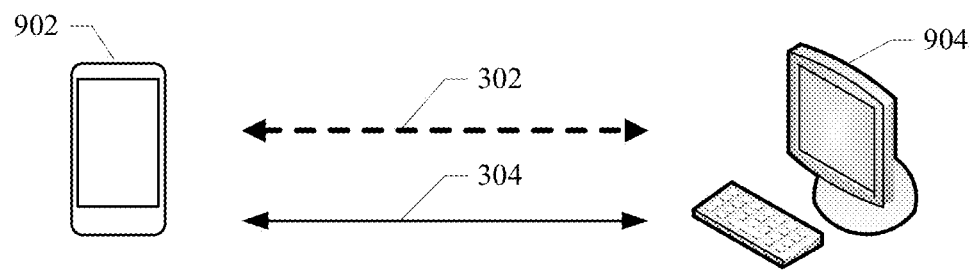

In some embodiments, a simultaneous multiple radio link connection is established, but simultaneous data transfer is not used due to reasons such as high power consumption, or because having one link for data transfer is more than sufficient for a needed QoS. In such configurations, one of the radio links 302 or 304 can be used for data transfer, while the other radio link can remain in an idle state, with only information that can be required to keep alive the radio link being transferred on the idle radio link. This mode can facilitate a rapid switch to simultaneous transfer mode, when needed. This mode can also be useful in cases where there may be a need to switch data transfer from one radio link to another radio link, such as due to mobility-related fallback situations. FIG. 10E illustrates an example simultaneous connection with "keep alive" mode in which data is transferred on radio link 304, while radio link 302 is kept alive in an idle mode. The time period during which radio link 302 is kept idle may vary depending on the configuration of master device 902 and slave device 904.

Simultaneous connection mode setup can be implementation specific to master device 902. Accordingly, master device 902 can choose whether to establish simultaneous connections at the outset and to always try to maintain radio links 302 and 304, or to set up one radio link (e.g., radio link 302) at the outset and later bring up a second radio link (e.g., radio link 304) if needed. For example, master device 902 may be configured in an "always simultaneous connection" mode, so that master device 902 can set up multiple radio links at the outset and always attempt to maintain the multiple radio link connections. In a "simultaneous connection on demand" configuration, master device 902 can establish a connection using a best possible radio link and, unless there is a need for an additional radio link, may not establish a connection on a second radio link. Table VII illustrates some exemplary settings of a simultaneous connection in the case where radio link 302 operates in a 2.4 GHz radio frequency band, and radio link 304 operates in a 5 GHz radio frequency band.

TABLE VII

| | |
|---|---|
| Simultaneous Transfer | 2.4 => 2.4 + 5 GHz |
| | 5 => 2.4 + 5 GHz |
| Simultaneous connection for seamless radio link switch | 2.4 => 2.4 + 5 => 5 GHz |
| | 5 => 2.4 + 5 GHz |

As an example, when a single radio link is available, but a bandwidth requirement is not sufficient due to QoS, setup of a second radio link can be used for simultaneous transfer.

As another example, when a 5 GHz to 2.4 GHz fallback is desirable, such as due to congestion on 5 GHz carrier, RSSI of 5 GHz connection, or a QoS of the 5 GHz connection approaching a threshold, a 2.4 GHz radio link can be established in a simultaneous connection. The radio link switch from a 5 GHz radio link to a 2.4 GHz radio link can be seamless. Similarly, if a device has only a 2.4 GHz radio link established, but is entering a range where 5 GHz operation can provide a better user experience, e.g. due to higher RSSI or better QoS, then a 5 GHz radio link can be brought up to support a seamless switch to a 5 GHz connection.

Some embodiments further support the use of multiple hop connections, such as a mesh-based network connection. In this regard, for example, when a device moves outside of range of a peer device, but remains within range of an intermediate device, a P2P connection with the peer device can be maintained by using the intermediate device as an intermediate hop in the connection. Accordingly, in some embodiments, multiple hops can be used within a cloud of devices to sustain a P2P data connection to avoid dropping a P2P session without resorting to cellular fallback.

Figure 11:
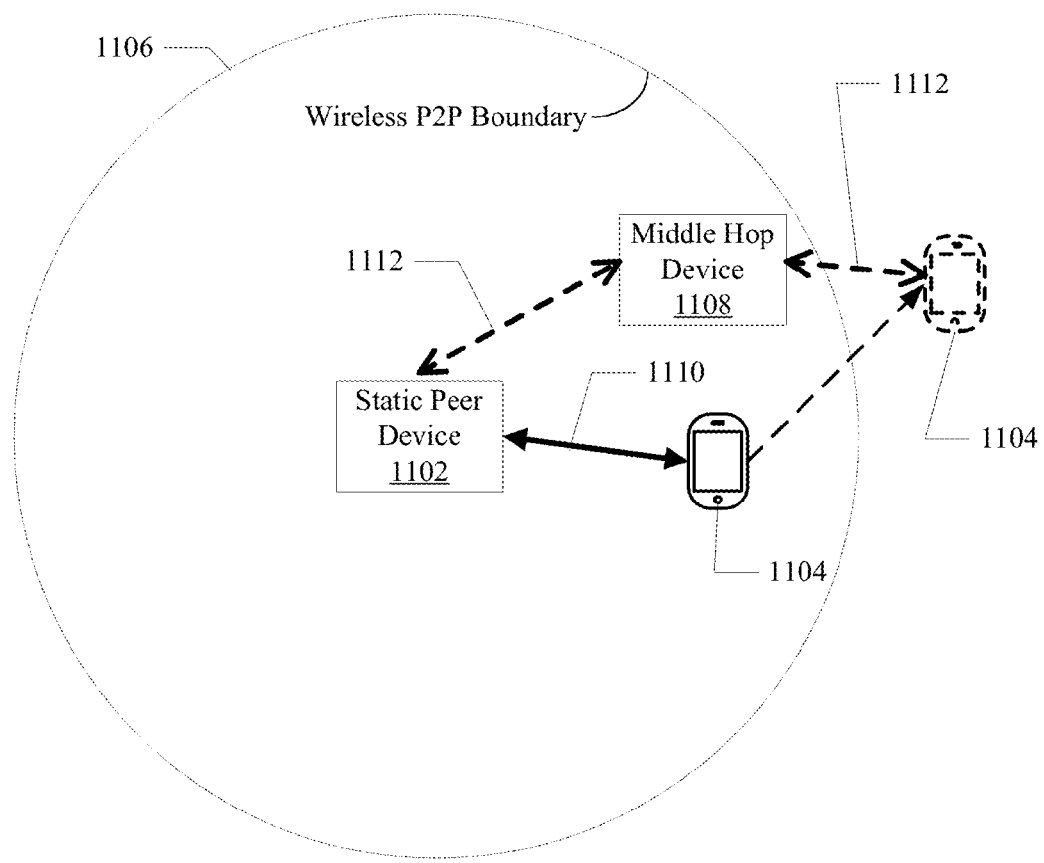
FIG. 11 illustrates a multi-hop operation in a multiple radio link application, in accordance with some embodiments.

FIG. 11 illustrates an example of multi-hop wireless P2P communication in accordance with some embodiments. A static peer device 1102, such as by way of non-limiting example, an Apple TV device, can be used to stream data to a mobile communication device 1104 via a wireless P2P connection 1110. The wireless P2P range of the static peer device 1102 can be represented by a boundary 1106. Mobility of the wireless communication device during a P2P session can result in the mobile communication device 1104 transitioning outside of boundary 1106. Mobile communication device 1104 can establish a wireless P2P connection 1112 with a middle hop device 1108 to continue the P2P session with peer device 1102 after it has moved outside of boundary 1106. In this regard, middle hop device 1108, which can be within boundary 1106, can relay P2P communications between static peer device 1102 and mobile communication device 1104. It will be appreciated that in some instances, multiple hops, e.g. through one or more devices, can be used. For example, if mobile communication device 1104 travels outside of a wireless P2P range of the middle hop device 1108, another hop can be added or replaced to continue the connection. It will be further appreciated that any of a variety of Wi-Fi link configurations can be used for connecting different hops (e.g., a 2.4 GHz link for each hop, a 5 GHz link for each hop, and a mixture of 2.4 and 5 GHz links and other radio frequency band links for one or more hops). Radio link configurations can be chosen based on a distance between hops, and thus can be adaptive based on received power thresholds. More generally, embodiments of a multi-hop operation consistent with this disclosure may include a mesh-based configuration to help maintain a wireless P2P communication regardless of the path and the number of hops between static peer device 1102 and mobile communication device 1104.

Figure 12:
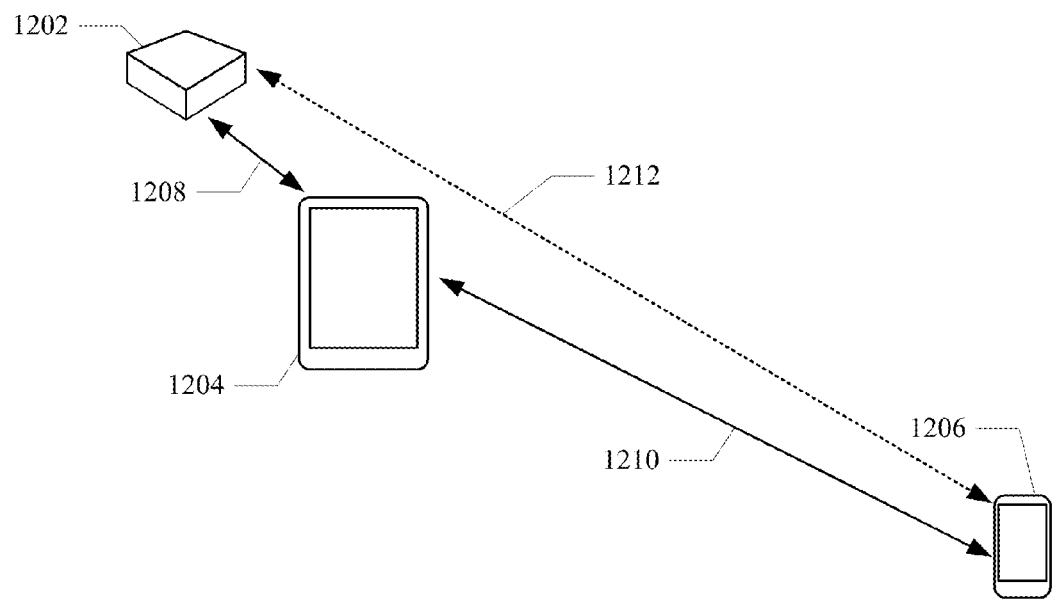
FIG. 12 illustrates a multi-hop operation in a multiple radio link connection, in accordance with some embodiments.

FIG. 12 illustrates another example of multi-hop wireless P2P communication in accordance with some embodiments. Devices 1202 and 1206 can be engaged in a wireless P2P session, with device 1204 serving as an intermediate hop. In the example radio link configuration of FIG. 12, devices 1202 and 1204 can establish a wireless communication through a radio link 1208. Likewise, devices 1204 and 1206 may establish a wireless communication through a radio link 1210. Accordingly, radio links 1208 and 1210 may be consistent with any of the radio links described herein. For example, radio links 1208 and 1210 may include radio links 302 and 304 in any of the configurations described herein. For example, radio link 1208 may include a concurrent operation of 2.4 GHz and 5 GHz radio links. In addition, radio link 1210 may include a single 2.4 GHz link. It will be appreciated, however, that other link configurations are contemplated for radio links 1208 and 1210 within the scope of the disclosure.

Figure 13A:
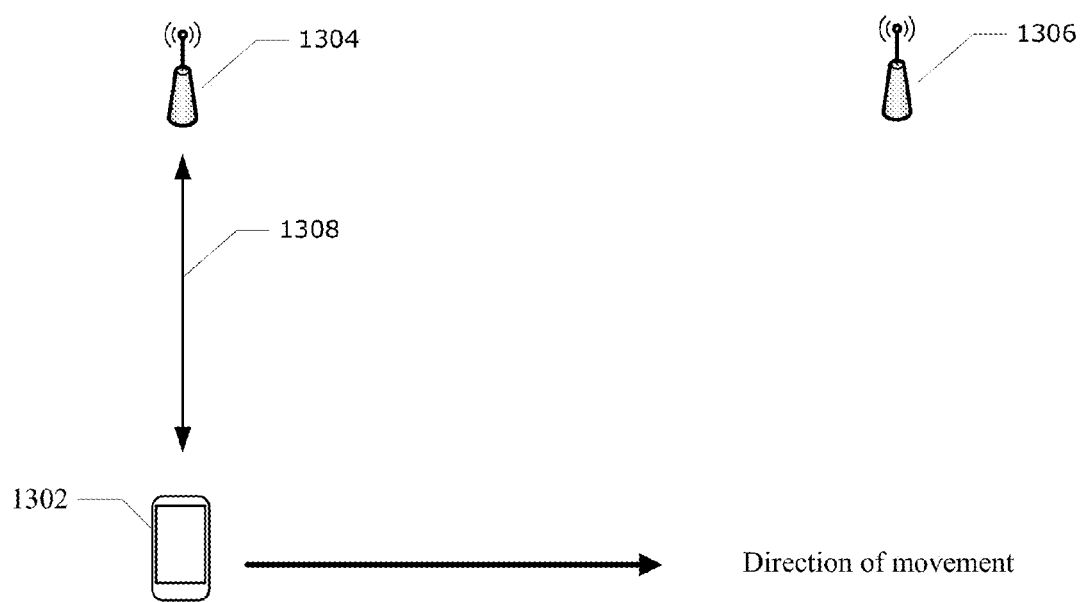
FIGS. 13A-13B illustrate soft roaming on wireless networks that support multiple radio link connections, in accordance with some embodiments.
Figure 13B:
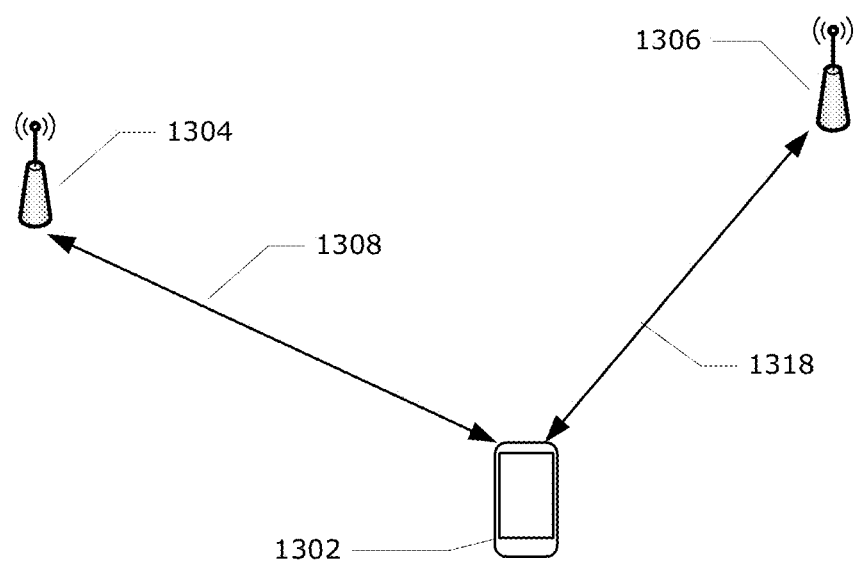

FIGS. 13A-13B illustrate "soft" roaming on wireless networks that support a multiple radio link connection, in accordance with some embodiments. Embodiments as in FIGS. 13A-13B can provide to a wireless communication device 1302 a seamless connection to multiple WLAN access points 1304 and 1306. Thus, some embodiments support "soft" roaming on wireless infrastructure networks. FIG. 13A illustrates wireless communication device 1302 having a radio link 1308 with a first access point 1304. For example, radio link 1308 may operate in a 5 GHz radio frequency band. As shown in FIG. 13A, wireless communication device 1302 can move toward a second access point 1306. Wireless communication device 1302 can have a "good" RSSI (RSSI 1) for radio link 1308. As illustrated in FIG. 13B, wireless communication device 1302 can also establish a second radio link connection 1318 with second access point 1306, even though RSSI 1 associated with radio link 1308 can exceed an RSSI roaming threshold. For example, radio link 1318 may operate in a 2.4 GHz radio frequency band as described herein. In some embodiments, a multiple radio link including radio link 1308 and radio link 1318 can be established in an intermediate zone. The intermediate zone can be defined based on values of RSSI 1 being less than an RSSI soft roaming threshold. The RSSI soft roaming threshold may be defined to be lower than an RSSI roaming threshold. Data transfer through both radio links 1308 and 1318 can provide increased bandwidth for a given application running on wireless communication device 1302. In fact, a plurality of applications running on wireless communication device 1302 may benefit from the increased bandwidth provided by use of radio links 1308 and 1318. Further, setting up radio link 1318 while maintaining radio link 1308 can enable a seamless transition, should wireless communication device 1302 move outside of the range of first access point 1304.

Figure 14:
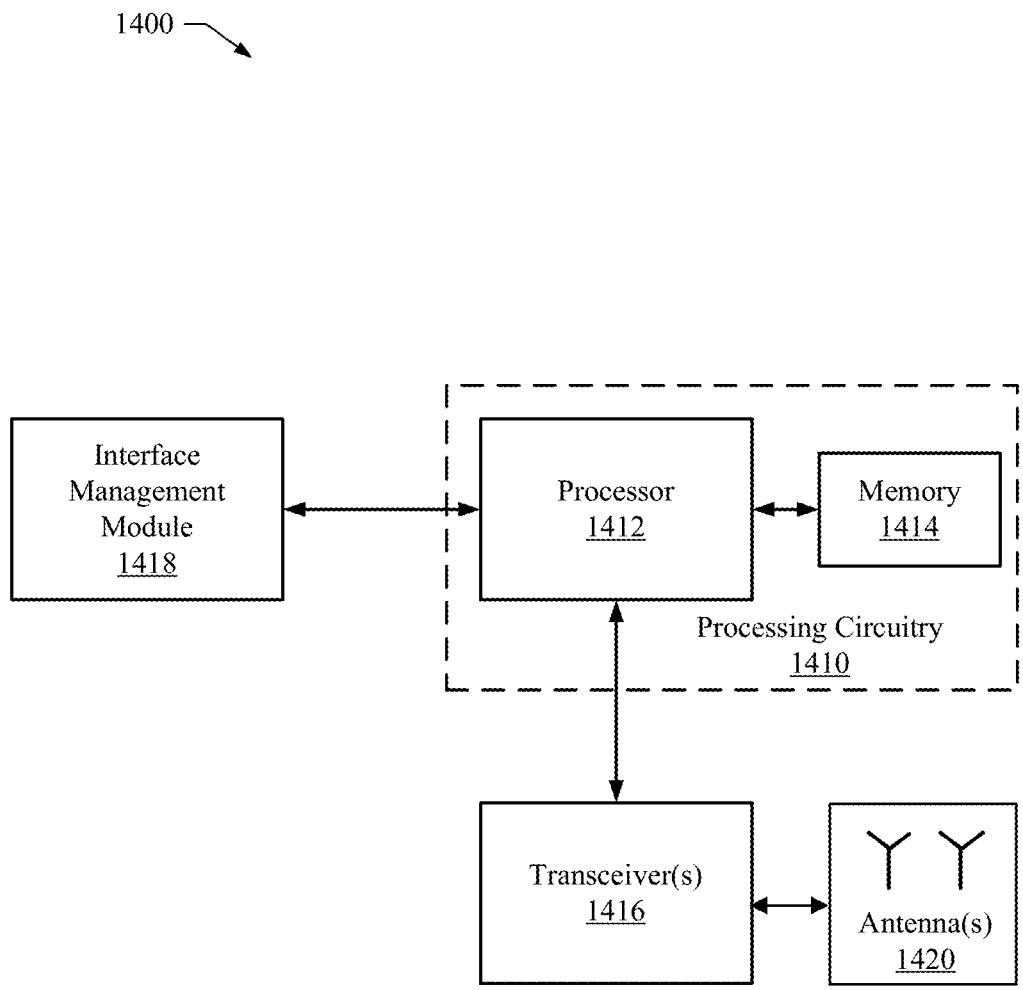
FIG. 14 illustrates a block diagram of an apparatus that can be implemented on a wireless communication device configured to utilize multiple radio link interfaces, in accordance with some embodiments.

FIG. 14 illustrates a block diagram of an apparatus 1400 that can be implemented on a wireless communication device configured to utilize multiple radio link interfaces, in accordance with some embodiments. In this regard, when implemented on a device, such as wireless communication device 102 or peer device 104, apparatus 1400 can enable the device to operate within system 100 in accordance with one or more embodiments (cf. FIG. 1). It will be appreciated that the components, or elements illustrated in and described with respect to FIG. 14 below may not be mandatory and thus some may be omitted in certain embodiments. Additionally, some embodiments can include further or different components, or elements beyond those illustrated in and described with respect to FIG. 14.

In some embodiments, apparatus 1400 can include a processing circuitry 1410 configurable to perform actions in accordance with one or more embodiments disclosed herein. In this regard, processing circuitry 1410 can be configured to perform and/or control performance of one or more functionalities of apparatus 1400 in accordance with various embodiments, and thus can provide means for performing functionalities of apparatus 1400 in accordance with various embodiments. Processing circuitry 1410 can be configured to perform data processing, application execution and/or other processing and management services according to one or more embodiments.

In some embodiments, apparatus 1400 or a portion(s) or component(s) thereof, such as processing circuitry 1410, can include one or more chipsets, which can each include one or more chips. Processing circuitry 1410 and/or one or more further components of apparatus 1400 can therefore, in some instances, be configured to implement an embodiment on a chipset comprising one or more chips. In some embodiments in which one or more components of apparatus 1400 are embodied as a chipset, the chipset can be capable of enabling a computing device to communicate with another device via a wireless communication technology. Thus, for example, one or more components of the apparatus 1400 can provide a chipset configured to enable a computing device to communicate via one or more WLAN technologies.

In some embodiments, processing circuitry 1410 can include a processor 1412 and, in some embodiments, such as that illustrated in FIG. 14, can further include a memory 1414. Processing circuitry 1410 can be in communication with or otherwise control transceiver(s) 1416 and/or interface management module 1418. Processor 1412 can be embodied in a variety of forms. For example, processor 1412 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that processor 1412 can comprise a plurality of processors. The plurality of processors can be in operative communication with each other and can be collectively configured to perform one or more functionalities of the apparatus 1400 as described herein. In some embodiments, processor 1412 can be configured to execute instructions that can be stored in memory 1414 or that can be otherwise accessible to processor 1412. As such, whether configured by hardware or by a combination of hardware and software, processor 1412 can be capable of performing operations according to various embodiments while configured accordingly.

In some embodiments, memory 1414 can include one or more memory devices. Memory 1414 can include fixed and/or removable memory devices. In some embodiments, memory 1414 can provide a non-transitory computer-readable storage medium that can store computer program instructions that can be executed by processor 1412. In this regard, memory 1414 can be configured to store information, data, applications, instructions and/or the like for enabling apparatus 1400 to carry out various functions in accordance with one or more embodiments. In some embodiments, memory 1414 can be in communication with one or more of processor 1412, transceiver(s) 1416, or interface management module 1418 via a bus(es) for passing information among components of the apparatus 1400.

Apparatus 1400 can further include transceiver(s) 1416. Transceiver(s) 1416 can be configured to enable apparatus 1400 to send wireless signals to and receive signals in accordance with one or wireless networking technologies. As such, transceiver(s) 1416 can enable apparatus 1400 to send and/or receive data via a wireless connection, such as a wireless P2P connection, cellular connection, and/or the like. Transceiver(s) 1416 may also include one or more antennas 1420. For example, antennas 1420 may include a first antenna for 2.4 GHz radio-frequency (RF) transmission and a second antenna for 5 GHz RF transmission. Accordingly, embodiments of apparatus 1400 may include a more stringent requirement for the antennas used, such as interference rejection for concurrent antenna use. For example, the spatial configuration of the antennas inside the apparatus may be arranged so as to minimize electro-magnetic interference (EMI) interference of different concurrent signals used by the two or more antennas.

Apparatus 1400 can further include an interface management module 1418. Interface management module 1418 can be embodied as circuitry, hardware, a computer program product comprising computer readable program instructions stored on a computer readable medium (for example, memory 1414) and executed by a processing device (for example, processor 1412), or some combination thereof. In some embodiments, processor 1412 (or processing circuitry 1410) can include, or otherwise control interface management module 1418. Interface management module 1418 can be configured to control a traffic inactivity timer that can be applied to transceiver(s) 1416. In this regard, interface management module 1418 can be configured to dynamically adapt an inactivity timeout value that can be applied based at least in part on observed conditions, such as an activity level that can be monitored on transceiver(s) 1416. Interface management module 1418 can be configured to manage establishment and maintenance of concurrent connections in accordance with various embodiments. The interface management module 1418 can be further configured to manage transition between interfaces, such as in response to defined thresholds, in accordance with various embodiments.

Figure 15:
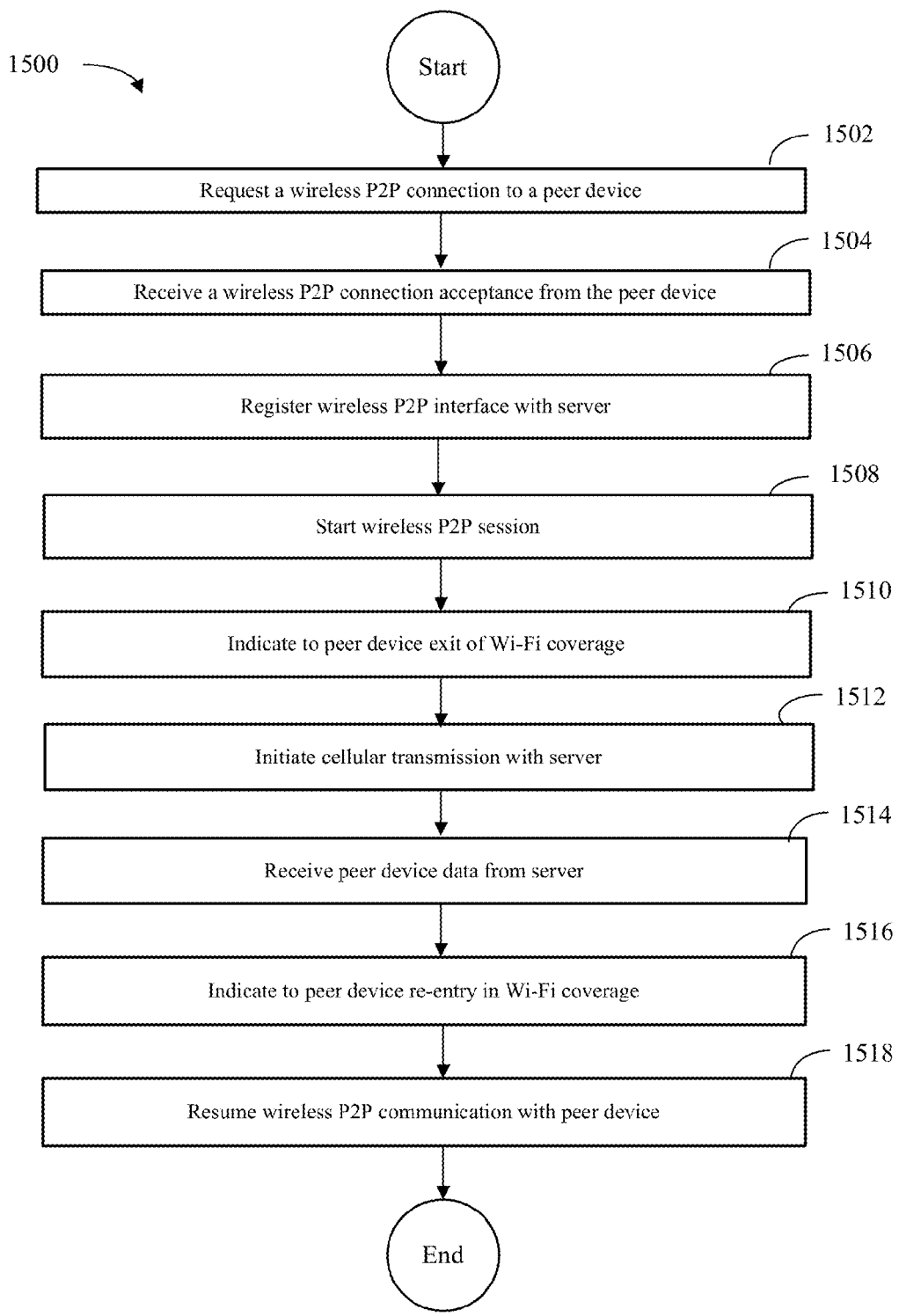
FIG. 15 illustrates a flow chart including steps in a method for managing multiple radio links for wireless P2P communication between a wireless communication device and a peer device, according to some embodiments.

FIG. 15 illustrates a flow chart including steps in a method 1500 for managing multiple radio links for wireless P2P communication between a wireless communication device and a peer device, using the wireless communication device, according to some embodiments. Method 1500 may be performed within a system for wireless P2P communication including a network access point and a network server, as described herein (e.g., system 100, access point 106, and server 116, cf. FIG. 1). The wireless communication device and the peer device in method 1500 may be as described herein (e.g., wireless communication device 102 and peer device 104, cf. FIG. 1). The multiple radio links for wireless P2P communication in method 1500 may also be as disclosed herein (e.g., radio link 302, 304, 1208, 1210, 1212, 1308, and 1318, cf. FIGS. 3A-3B, FIG. 12, and FIGS. 13A-13B). Steps in method 1500 may be performed simultaneously or in any order, according to embodiments consistent with the present disclosure. Furthermore, in some embodiments method 1500 may include at least one of the steps illustrated in FIG. 15 and described below. Steps in method 1500 may be at least partially performed by a processor circuit in the wireless communication device. Accordingly, a non-transitory computer readable medium may store commands that when executed by the processor circuit cause the wireless communication device to perform at least partially one or more of the steps described in detail below. The non-transitory computer readable medium may include a memory circuit in the wireless communication device (e.g., processor 1412 and memory 1414, cf. FIG. 14).

Step 1502 includes requesting a wireless P2P connection to a peer device. Step 1504 includes receiving a wireless P2P connection acceptance from the peer device, in response to the request. Step 1506 includes registering a wireless P2P interface between the wireless communication device and the peer device with the server. Accordingly, step 1506 may include pushing an address mapping for the wireless communication device including multiple links accessible by the wireless communication device hardware (cf. Table I). In some embodiments, step 1506 may include providing interface address information for each of a plurality of radio interfaces implemented on the wireless communication device to the peer device, the plurality of radio interfaces including at least a first radio interface and a second radio interface. Step 1508 includes starting a wireless P2P session between the wireless communication device and the peer device.

Step 1510 includes indicating to the peer device that the wireless communication device is about to exit the Wi-Fi coverage. In some embodiments, step 1510 may include establishing a threshold for transitioning between the first radio interface and the second radio interface during the wireless P2P session, and determining during the wireless P2P session whether the threshold has been met. In some embodiments, the threshold in step 1510 may be associated to a path loss threshold (cf. path loss threshold 306, FIG. 3A), or a signal power threshold (cf. Tables IV and V). Step 1510 may include providing a cellular interface address of the wireless communication device to the peer device (cf. TABLE I). Step 1512 includes initiating a cellular transmission with the server. Step 1514 includes receiving peer device data from the server. Step 1516 includes indicating to the peer device re-entry in the Wi-Fi coverage. Step 1518 includes resuming a wireless P2P communication with the peer device.

Figure 16:
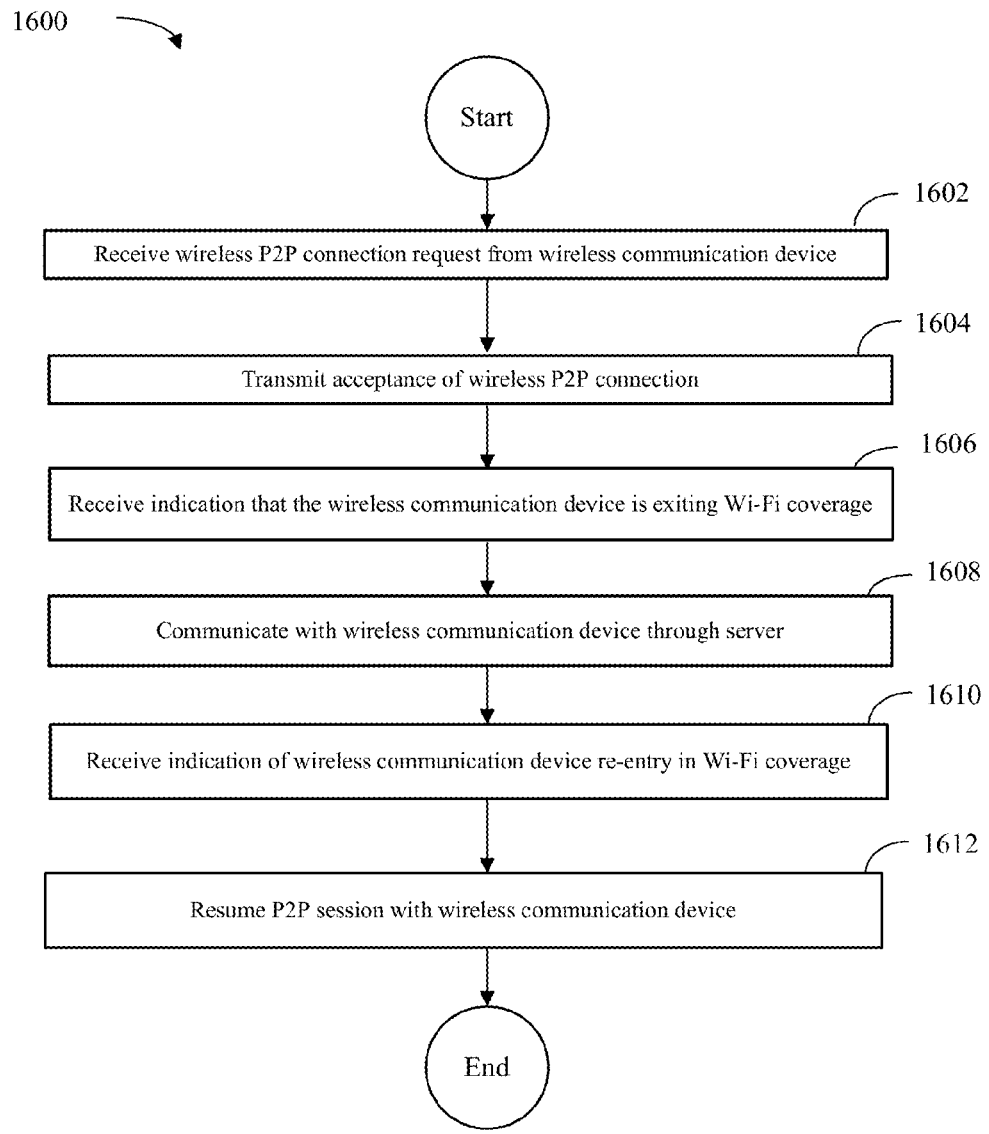
FIG. 16 illustrates a flow chart including steps in a method for managing multiple radio links for wireless P2P communication between a wireless device and a peer device, according to some embodiments.

FIG. 16 illustrates a flow chart including steps in a method 1600 for managing multiple radio links for wireless P2P communication using a peer device, according to some embodiments. Method 1600 may be performed within a system for P2P communication including a network access point and a network server, as described herein (e.g., system 100, access point 106, and server 116, cf. FIG. 1). The wireless communication device and the peer device in method 1600 may be as described herein (e.g., wireless communication device 102 and peer device 104, cf. FIG. 1). The multiple radio links for wireless P2P communication in method 1600 may also be as disclosed herein (e.g., radio link 302, 304, 1208, 1210, 1212, 1308, and 1318, cf. FIGS. 3A-3B, FIG. 12, and FIGS. 13A-13B). Steps in method 1600 may be performed simultaneously or in any order, according to embodiments consistent with the present disclosure. Furthermore, in some embodiments, method 1600 may include at least one of the steps illustrated in FIG. 16 and described below. Steps in method 1600 may be at least partially performed by a processor circuit in the wireless communication device. Accordingly, a non-transitory computer readable medium may store commands that when executed by the processor circuit cause the peer device to perform at least partially one or more of the steps described in detail below. The non-transitory computer readable medium may include a memory circuit in the peer device (e.g., processor 1412 and memory 1414, cf. FIG. 14).

Step 1602 includes receiving a wireless P2P connection request from the wireless communication device. Step 1604 includes transmitting an acceptance of the wireless P2P connection. Step 1606 includes receiving an indication that the wireless communication device is exiting the Wi-Fi coverage. Step 1608 includes communicating with the wireless communication device through the server. Accordingly, step 1608 may include communicating with a network access point that is in turn coupled to the server, while the server communicates with the wireless communication device through a cellular interface. Step 1610 includes receiving an indication that the wireless communication device is re-entering the Wi-Fi coverage. Step 1612 includes resuming a wireless P2P session with the wireless communication device.

Figure 17:
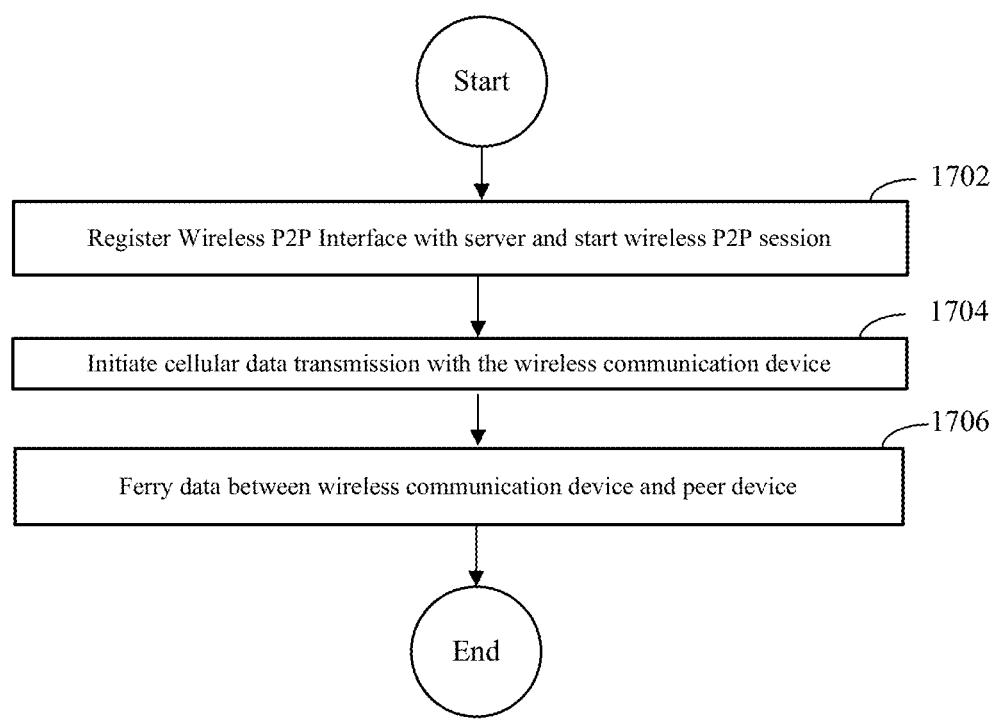
FIG. 17 illustrates a flow chart including steps in a method for managing multiple radio links for wireless P2P communication between a wireless device and a peer device using a server, according to some embodiments.

FIG. 17 illustrates a flow chart including steps in a method 1700 for managing multiple radio links for wireless P2P communication using a server, according to some embodiments. Method 1700 may be performed within a system for P2P communication including a network access point and a network server, as described herein (e.g., system 100, access point 106 and server 116, cf. FIG. 1). The wireless communication device and the peer device in method 1700 may be as described herein (e.g., wireless communication device 102 and peer device 104, cf. FIG. 1). The multiple radio links for wireless P2P communication in method 1700 may also be as disclosed herein (e.g., radio link 302, 304, 1208, 1210, 1212, 1308, and 1318, cf. FIGS. 3A-3B, FIG. 12, and FIGS. 13A-13B). Steps in method 1700 may be performed simultaneously or in any order, according to embodiments consistent with the present disclosure. Furthermore, in some embodiments, method 1700 may include at least one of the steps illustrated in FIG. 17 and described below. Steps in method 1700 may be at least partially performed by a processor circuit in the server. Accordingly, a non-transitory computer readable medium may store commands that when executed by the processor circuit cause the peer device to perform at least partially one or more of the steps described in detail below. The non-transitory computer readable medium may include a memory circuit in the peer device.

Step 1702 includes registering a wireless P2P interface between the wireless communication device and the peer device with the server, and starting the wireless P2P session. Step 1704 includes initiating cellular data transmission with the wireless communication device. Step 1706 includes ferrying data between the wireless communication device and the peer device.

Representative applications of systems, methods, apparatuses, and computer program products according to the present disclosure have been described. These examples are being provided solely to add context and aid in the understanding of the described embodiments. It will thus be apparent to one skilled in the art that the above described embodiments may be practiced without some or all of these specific details. In other instances, well known process steps have not been described in detail in order to avoid unnecessarily obscuring the described embodiments. Other applications are possible, such that the following examples should not be taken as limiting.

In the foregoing detailed description, references have been made to the accompanying drawings, which form a part of the description and in which are shown, by way of illustration, specific embodiments in accordance with the described embodiments. Although these embodiments were described in sufficient detail to enable one skilled in the art to practice the described embodiments, it is understood that these examples are not limiting; such that other embodiments may be used, and changes may be made without departing from the spirit and scope of the described embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling device applications or as computer readable code on a computer readable medium for controlling a device communication interface. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for management of multiple radio links for a wireless peer-to-peer (P2P) session, the method comprising a wireless communication device:
   providing individual interface address information for each of a plurality of radio interfaces implemented on the wireless communication device to a peer device, the plurality of radio interfaces comprising a first radio interface and a second radio interface;
   establishing the wireless P2P session with the peer device;
   establishing a threshold for transitioning between the first radio interface and the second radio interface during the wireless P2P session;
   adjusting the threshold for transitioning between the first radio interface and the second radio interface based at least in part on a Quality of Service (QoS) class for an active application that transfers data via one or more of the first radio interface and the second radio interface during the wireless P2P session;

determining during the wireless P2P session whether the threshold has been met; and in response to the threshold being met:
signaling to the peer device to transition the wireless P2P session from the first radio interface to the second radio interface; and
using the second radio interface to continue the wireless P2P session.

2. The method of claim 1, wherein adjusting the threshold for transitioning between the first radio interface and the second radio interface comprises determining a hysteresis parameter value applicable to the active application and adjusting the threshold based on the hysteresis parameter value.

3. The method of claim 1, further comprising establishing a second threshold for transitioning between the first radio interface and the second radio interface based on measurements of a received power, wherein the wireless communication device transitions only based on both the threshold based on the QoS class and the second threshold based on the received power being met.

4. The method of claim 1, further comprising maintaining the second radio interface in an idle state when the wireless P2P session is established through the first radio interface.

5. The method of claim 1, wherein establishing the wireless P2P session with the peer device comprises establishing a communication link with the first radio interface concurrent with the second radio interface when a wireless range between the peer device and the wireless communication device is within a first region.

6. The method of claim 1, further comprising signaling to the peer device to transition the wireless P2P session to a Wi-Fi access point to continue the wireless P2P session.

7. The method of claim 1, further comprising:
signaling to the peer device that the wireless communication device is about to exit a wireless range; and
establishing a cellular connection to a network server to continue the wireless P2P session.

8. The method of claim 1, wherein providing individual interface address information for each of the plurality of radio interfaces comprises providing an internet protocol (IP) address for the wireless communication device and providing a virtual IP address for at least two of the plurality of radio interfaces.

9. The method of claim 1, further comprising:
running the active application in the wireless communication device, and
routing data for the active application through a plurality of transmission protocol IP (TCP/IP) stacks, wherein:
each TCP/IP stack of the plurality of TCP/IP stacks is configured to operate with one of the plurality of radio interfaces, and
which TCP/IP stacks and associated radio interfaces to use for the active application is based at least in part on the QoS class for the active application.

10. The method of claim 1, further comprising running a plurality of applications in the wireless communication device, and routing data for the plurality of applications through a TCP/IP stack associated with an IP redundancy module, wherein the IP redundancy module is configured to route data through a plurality of media access control (MAC) layers, each MAC layer associated with one of the plurality of radio interfaces.

11. The method of claim 1, wherein establishing the wireless P2P session comprises establishing a first wireless P2P session, the method further comprising establishing a second wireless P2P session with a second peer device through the second radio interface while the first wireless P2P session with the peer device occurs through the first radio interface, and the wireless communication device is moving away from the peer device and closer to the second peer device.

12. A method for management of multiple radio links for a wireless peer-to-peer (P2P) session, the method comprising a peer device:
receiving a wireless P2P connection request from a wireless communication device;
transmitting an acceptance of the wireless P2P connection request to the wireless communication device;
starting the wireless P2P session using a first radio link;
receiving an indication that the wireless communication device is exiting a wireless range for the first radio link;
determining a second radio link to support data transfer for an active application based at least in part on a Quality of Service (QoS) class for the active application; and
transitioning the wireless P2P session to use the second radio link.

13. The method of claim 12, further comprising receiving an indication that the wireless communication device is re-entering the wireless range of the first radio link; and
transitioning the wireless P2P session to use the first radio link.

14. The method of claim 12, wherein receiving the indication that the wireless communication device is exiting the wireless range of the first radio link comprises receiving a request from the wireless communication device to switch the wireless P2P session to the second radio link.

15. The method of claim 12, wherein receiving the indication that the wireless communication device is exiting the wireless range of the first radio link comprises receiving a request from the wireless communication device to continue the wireless P2P session with the first radio link or the second radio link according to a quality of service of the wireless P2P session.

16. The method of claim 12, further comprising establishing a multi-hop wireless P2P communication through an intermediate device by establishing a radio link with the intermediate device using at least one of the first radio link and the second radio link.

17. A wireless communication device comprising:
a plurality of radio interfaces;
a radio interface management module; and
processing circuitry comprising a processor and a memory storing instructions that, when executed by the processor, cause the wireless communication device to:
provide individual interface address information for each of the plurality of radio interfaces implemented on the wireless communication device to a peer device, the plurality of radio interfaces comprising a first radio interface and a second radio interface;
establish a wireless P2P session with the peer device;
establish a threshold for transitioning between the first radio interface and the second radio interface during the wireless P2P session;
adjust the threshold for transitioning between the first radio interface and the second radio interface based at least in part on a Quality of Service (QoS) class for an active application that transfers data via one or more of the first radio interface and the second radio interface during the wireless P2P session;

determine during the wireless P2P session whether the threshold has been met; and in response to the threshold being met:
- signal to the peer device to transition the wireless P2P session from the first radio interface to the second radio interface; and
- use the second radio interface to continue the wireless P2P session.

18. The wireless communication device of claim 17, further comprising an Internet Protocol (IP) redundancy module configured to route the data associated with the active application via a plurality of Media Access Control (MAC) layers, each MAC layer associated with data transferred via the plurality of radio interfaces.

19. The wireless communication device of claim 17, wherein:
- the active application is configured to route data through a plurality of transmission protocol IP (TCP/IP) stacks, and
- each TCP/IP stack of the plurality of TCP/IP stacks is configured to operate with data transferred via the plurality of radio interfaces.

20. The wireless communication device of claim 17, wherein the wireless communication device adjusts the threshold for transitioning between the first radio interface and the second radio interface by at least determining a hysteresis parameter value applicable to the active application and adjusting the threshold based on the hysteresis parameter value.

* * * * *